(12) United States Patent
Kosuda

(10) Patent No.: US 8,854,694 B2
(45) Date of Patent: Oct. 7, 2014

(54) COMMUNICATION DEVICE AND FACSIMILE SYSTEM

(71) Applicant: Oki Data Corporation, Tokyo (JP)

(72) Inventor: Shota Kosuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 16 days.

(21) Appl. No.: 13/796,821

(22) Filed: Mar. 12, 2013

(65) Prior Publication Data
US 2013/0258417 A1  Oct. 3, 2013

(30) Foreign Application Priority Data
Mar. 28, 2012 (JP) .................................. 2012-073239

(51) Int. Cl.
| | |
|---|---|
| H04N 1/00 | (2006.01) |
| H04N 1/32 | (2006.01) |
| H04L 12/54 | (2013.01) |
| G06F 15/00 | (2006.01) |
| G06F 3/12 | (2006.01) |
| H04L 12/58 | (2006.01) |

(52) U.S. Cl.
CPC ....... *H04N 1/00209* (2013.01); *H04N 1/32064* (2013.01); *H04L 12/54* (2013.01); *H04L 12/5855* (2013.01); *H04N 1/0022* (2013.01)
USPC ......................................... 358/402; 358/1.15

(58) Field of Classification Search
CPC .......... H04N 1/32064; H04N 1/00209; H04N 1/0022; H04L 12/54; H04L 12/5855
USPC ................................................. 358/402, 1.15
See application file for complete search history.

(56) References Cited

U.S. PATENT DOCUMENTS

| | | | |
|---|---|---|---|
| 6,535,303 B1 * | 3/2003 | Wolf | 358/434 |
| 7,295,337 B2 * | 11/2007 | Eguchi et al. | 358/1.15 |
| 7,884,956 B2 * | 2/2011 | Nakamura | 358/1.15 |

FOREIGN PATENT DOCUMENTS

| | | |
|---|---|---|
| JP | 11-154969 A | 6/1999 |
| JP | 2003-219028 A | 7/2003 |
| JP | 2003-271515 A | 9/2003 |
| JP | A-2006-352734 | 12/2006 |

* cited by examiner

*Primary Examiner* — Douglas Tran
(74) *Attorney, Agent, or Firm* — Muncy, Geissler, Olds & Lowe, P.C.

(57) ABSTRACT

A communication device includes an input unit specifying a transmission destination telephone number, a communication unit transmitting an e-mail to a specified server connected to a network, a mail generating unit generating a facsimile server addressed e-mail, and a control unit. Wherein, the control unit controls the mail generating unit and the communication unit in such a manner that, when a plurality of transmission destination telephone numbers are specified as the one or more numbers of the transmission destination telephone numbers by the input unit, the mail generating unit generates a facsimile server addressed e-mail to which a facsimile server addressed mail address, and the communication unit transmits the facsimile server addressed e-mail to a facsimile server as a destination fewer times than the number of the plurality of the transmission destination telephone numbers.

11 Claims, 20 Drawing Sheets

Fig. 12

```
Date: Sun, 21 Mar 2010 21:35:24 +0900
From: mfp100@aaa.com
To: 05@faxsvr.com, 06@faxsvr.com          ← Transmission Destination
Subject: toFaxServer Send
Message-ID: <20A79708.000000A8.00000001.13333331@aaa.com>   ← ID for Each Mail
MIME-Version: 1.0
Content-Type: multipart/mixed; boundary="__054785409037471250020547842293_="

__054785409037471250020547842293_=
Content-Type: text/plain; charset=utf-8

Attachment File Format: TIFF (Omitted)

__054785409037471250020547842293_=
Content-Type: image/tiff; name="20100321xxxxxx.tif"
Content-Disposition: attachment; filename="20100321xxxxxx.tif"
Content-Transfer-Encoding: base64

TUOAKgAAxxxxxxxxxxxxxxxxxxxxxxxxxxxxxxxxxxxxxxxxxxxxxxxxxxxxx   ← Image
xxxxxxxxxxxxxxxxxxxxxx... (Omitted)                               (Attached TIFF File)

__054785409037471250020547842293_=--
```

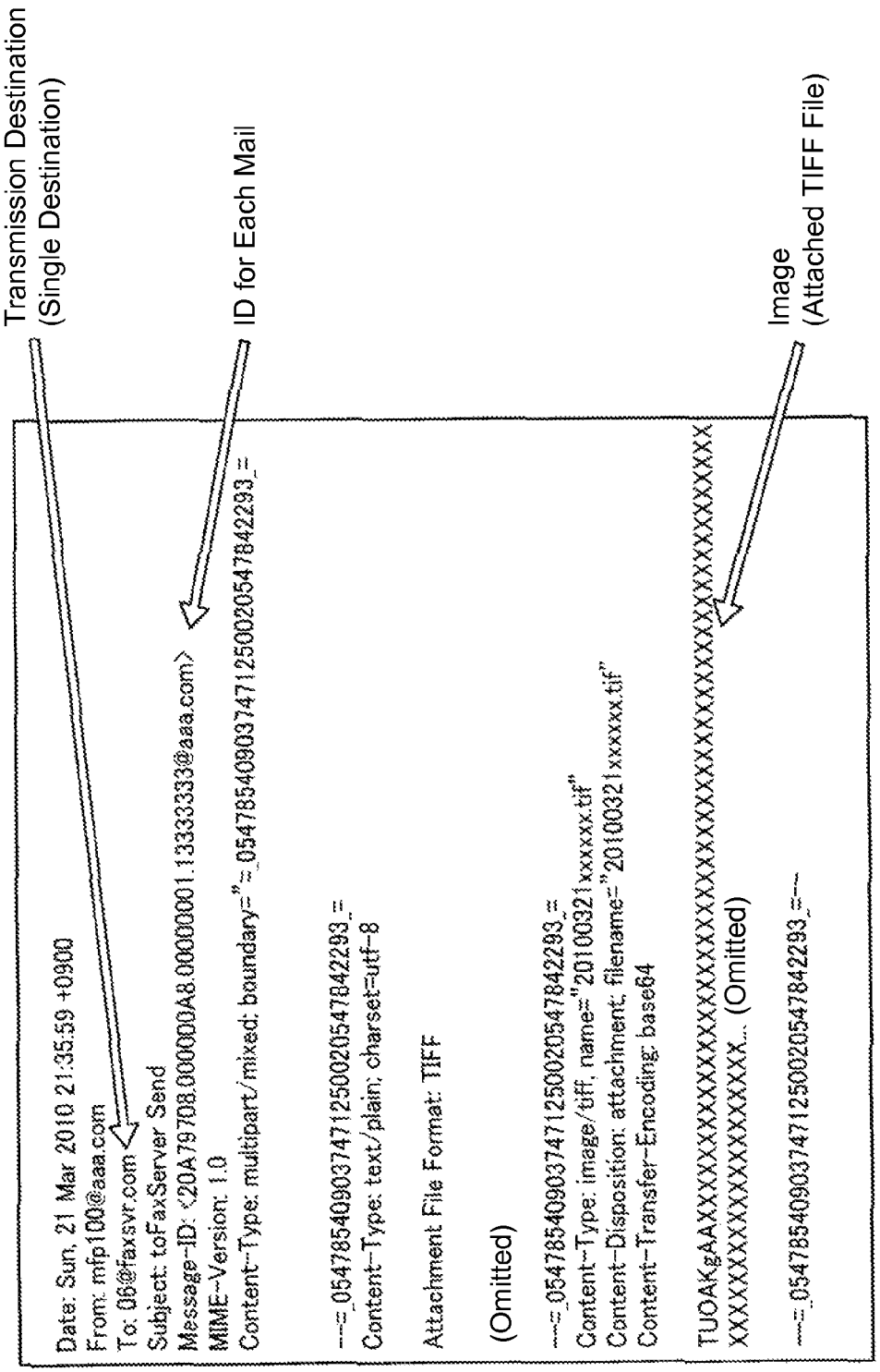

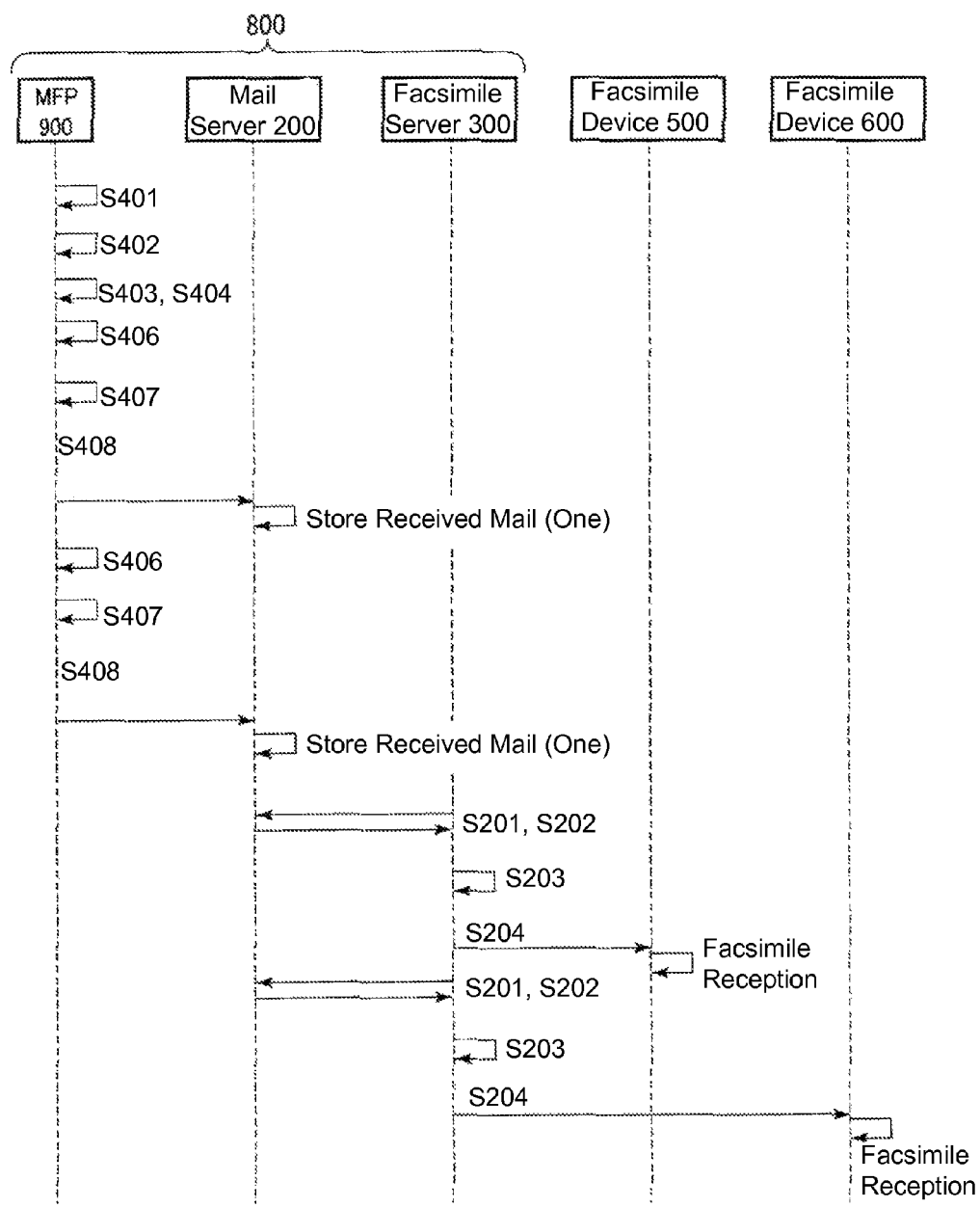

COMMUNICATION DEVICE AND FACSIMILE SYSTEM

CROSS REFERENCE TO RELATED APPLICATION

The present application is related to, claims priority from and incorporates by reference Japanese Patent Application No. 2012-073239, filed on Mar. 28, 2012.

TECHNOLOGY FIELD

The present application relates to a communication device and a facsimile system.

BACKGROUND

A facsimile system is known that is configured by network-connecting a communication device, a mail server and a facsimile server, the communication device having e-mail transmission function, the facsimile server facsimile (FAX)-transmitting a transmission image based on an image attached to an e-mail from the communication device (for example, see JP Laid-Open Patent Application Publication No. 2006-352734).

For example, it is also possible that the communication device generates an e-mail in which a mail address including a transmission destination telephone number of a FAX transmission is specified in a "To" field, which is a field describing an e-mail transmission destination, and transmits this e-mail (facsimile server addressed e-mail) to the mail server by using simple mail transfer protocol (SMTP), and then the mail server performs transmission to the facsimile server (facsimile server addressed transmission). The facsimile server receives the e-mail from the communication device via the mail server, determines a transmission destination telephone number from numbers in the "To" field of the e-mail, and performs FAX transmission to a facsimile device of the transmission destination telephone number.

Further, it is also possible that the communication device generates an e-mail (broadcast facsimile server addressed e-mail) in which a plurality of mail addresses each including a transmission destination telephone number of FAX transmission are specified in the "To" field of the e-mail and transmits this e-mail to the mail server, and then the mail server performs transmission to the facsimile server (broadcast facsimile server addressed transmission). The facsimile server receives the e-mail from the communication device via the mail server, determines a plurality of specified transmission destination telephone numbers from numbers in the "To" field of the e-mail, and performs broadcast FAX transmission to a plurality of facsimile devices of the transmission destination telephone numbers.

However, similar to the case of broadcast transmission of a normal e-mail, a mail server in a conventional facsimile system may generate an e-mail for the same number of times as the number of the mail addresses described in the "To" field of the e-mail and store the generated plurality of e-mails in a mailbox of the mail server. In this case, the plurality of the e-mails of the same content is redundantly stored in the mailbox. Therefore, the facsimile server performs broadcast FAX transmission of the e-mails of the same content to a plurality of facsimile devices for the same number of times as the number of e-mails stored in the mailbox. For this reason, there is a problem that a user of a facsimile device feels the inconvenience that multiple facsimile images of the same content are continuously received at the same facsimile device.

Therefore, a purpose of the present application is to provide a communication device and a facsimile system that allow the inconvenience that multiple facsimile images of the same content are received at the same facsimile device to be reduced even when a plurality of transmission destination telephone numbers are specified as facsimile transmission destinations.

SUMMARY

A communication device disclosed in the application includes, an input unit specifying a transmission destination telephone number that indicates a facsimile transmission destination, a communication unit transmitting an e-mail to a specified server among servers that are connected to a network, a mail generating unit generating a facsimile server addressed e-mail to which a facsimile server addressed mail address is given, that is a mail address containing one or more numbers of the transmission destination telephone numbers, and a control unit. Wherein, the control unit controls the mail generating unit and the communication unit in such a manner that, when a plurality of transmission destination telephone numbers are specified as the one or more numbers of the transmission destination telephone numbers by the input unit, the mail generating unit generates a facsimile server addressed e-mail to which a facsimile server addressed mail address, which contains the plurality of the transmission destination telephone numbers, is given, and the communication unit transmits the facsimile server addressed e-mail generated by the mail generating unit to a facsimile server, which is regarded as the specified server, as a destination fewer times than the number of the plurality of the transmission destination telephone numbers.

According to the present application, the inconvenience that multiple facsimile images of the same content are sent to a recipient can be reduced even when a plurality of transmission destination telephone numbers are specified as facsimile transmission destinations.

BRIEF DESCRIPTION OF THE DRAWINGS

FIG. 12 illustrates an example of data in a mail format of a facsimile server addressed e-mail of which transmission destinations are "05@faxsvr.com" and "06@faxsvr.com" in the first embodiment.

FIG. 19 illustrates an example of data in a mail format of a facsimile server addressed e-mail of which a transmission destination is "06@faxsvr.com" in the second embodiment.

FIG. 20 is a sequence diagram illustrating a broadcast facsimile server addressed transmission and a broadcast FAX transmission to a plurality of facsimile devices in the facsimile system according to the second embodiment.

DETAILED DESCRIPTION OF THE EMBODIMENTS

In the following, a communication device and a facsimile system of a comparative example are briefly explained, and thereafter, communication devices and facsimile systems according to first and second embodiments of the present application are explained in detail.

<<1>> Explanation of Comparative Example

Figure 1:
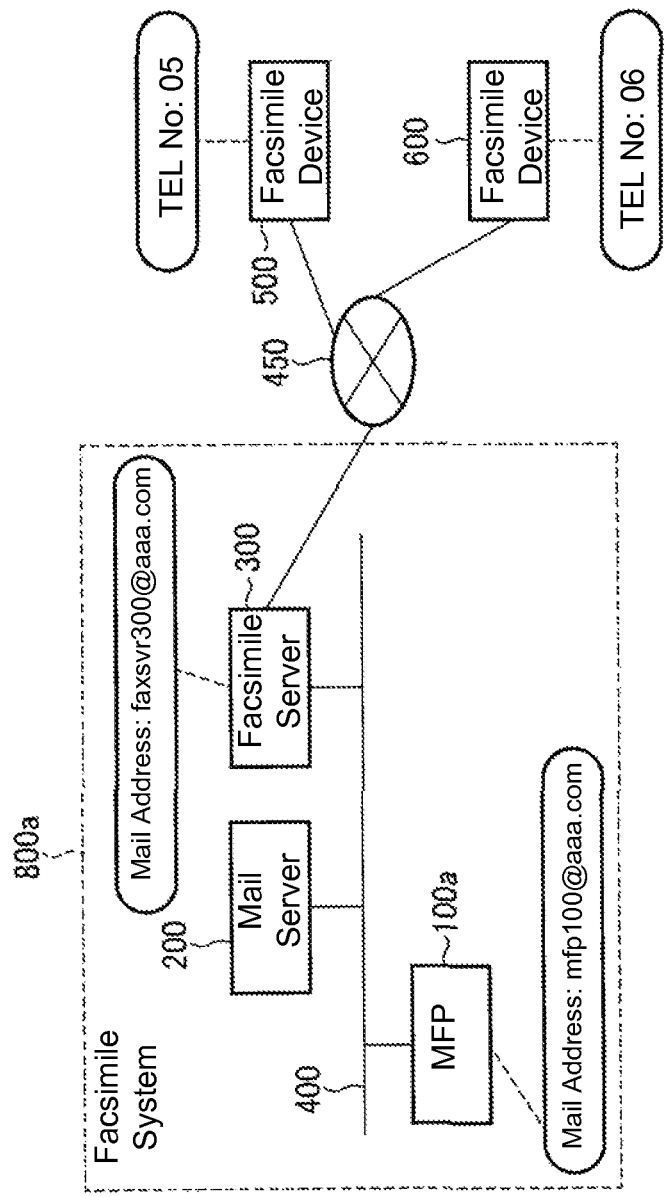
FIG. 1 illustrates a facsimile system of a comparative example and facsimile devices as FAX transmission destinations.

FIG. 1 illustrates a facsimile system 800a of the comparative example and facsimile devices 500 and 600 as FAX transmission destinations. As illustrated in FIG. 1, the facsimile system 800a of the comparative example includes a multifunctional peripheral (MFP) 100a as a communication device, a mail server 200 and a facsimile server 300, and the MFP 100a, the mail server 200 and the facsimile server 300 are connected via a network 400 in a manner capable of communicating with each other. The facsimile server 300 is a device capable of transmitting and receiving facsimile (FAX) data via a public telephone network 450.

Figure 2A:
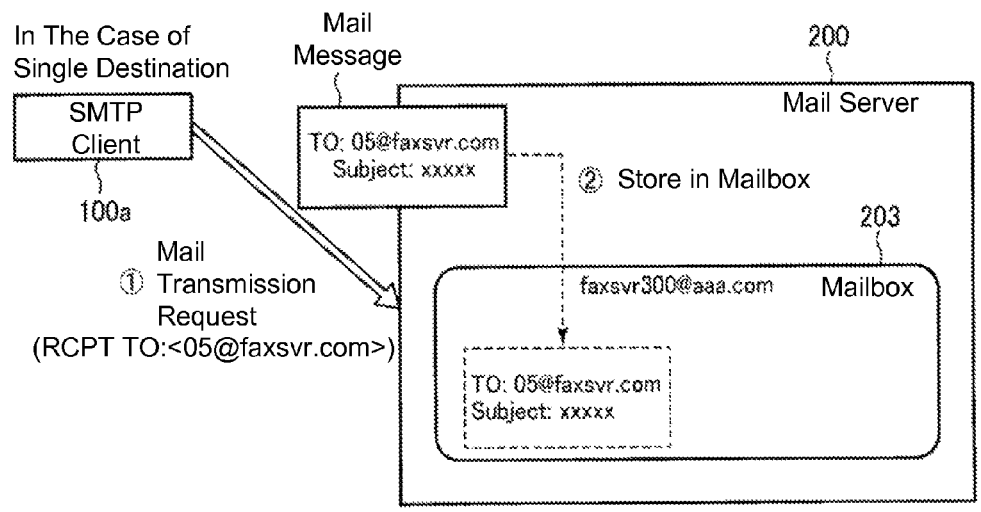
FIGS. 2A and 2B are explanatory diagrams illustrating storing operations of a facsimile server addressed e-mail in the facsimile system of the comparative example.
Figure 2B:
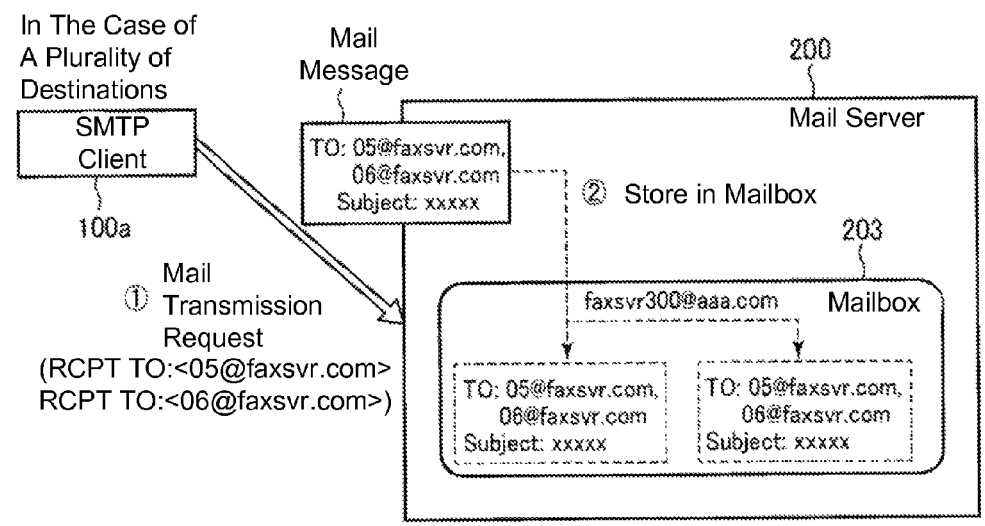

FIGS. 2A and 2B are explanatory diagrams illustrating storing operations of a facsimile server addressed e-mail in the facsimile system 800a of the comparative example. In the facsimile system 800a of the comparative example, when an e-mail of a mail address that does not exist or an e-mail of a mail address of a preset domain name is received from the MFP 100a as an SMTP client, the mail server 200 stores this e-mail in a predetermined mailbox 203 of the mail server 200. For example, as illustrated in FIG. 2A, when a facsimile server addressed e-mail of a mail address (for example, "05@faxsvr.com") with a domain name "faxsvr.com" is received, the mail server 200 stores the e-mail in the mailbox 203 for the facsimile server 300 having a mail address "faxsvr300@aaa.com." Further, as illustrated in FIG. 2B, when a plurality of e-mails of mail addresses (for example, "05@faxsvr.com" and "06@faxsvr.com") with a domain name "faxsvr.com" are received, the mail server 200 stores the e-mails in the mailbox 203. The allows all the e-mails of the mail addresses with a domain name "faxsvr.com" that are received by the mail server 200 to be stored in the mailbox 203 and allows the facsimile server 300 having the mail address "faxsvr300@aaa.com" to receive all the e-mails of the transmission destination mail addresses with the domain name "faxsvr.com" that are received by the mail server 200.

However, the mail server 200 may be set in such a manner that, when a transmission request of an e-mail specifying a plurality of mail addresses having the domain name "faxsvr.com" is received, the same number of e-mails (mail messages) as the number of the plurality of the specified mail addresses are stored in the mailbox 203. For such a mail server 200, in FIG. 2A, there is one transmission destination, which is "RCPT TO: <05@faxsvr.com>" so that one mail message is stored in the mailbox 203. In FIG. 2B, there are two transmission destinations, which are "RCPT TO: <05@faxsvr.com>" and "RCPT TO:<06@faxsvr.com>" so that two mail messages are stored in the mailbox 203.

Figure 3:
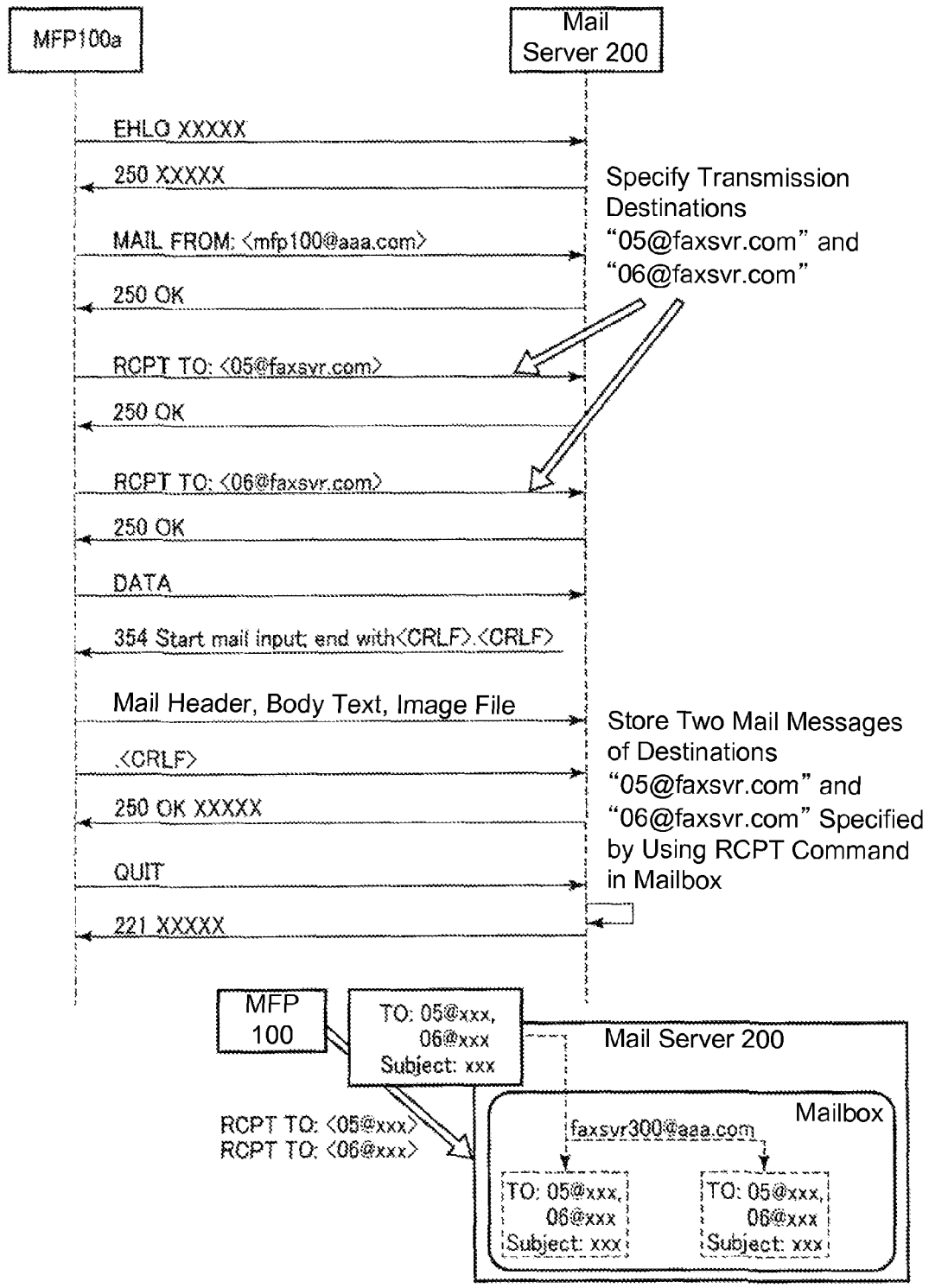
FIG. 3 is a sequence diagram illustrating broadcast facsimile server addressed transmission in the facsimile system of the comparative example.

FIG. 3 is a sequence diagram illustrating a broadcast facsimile server addressed transmission in the facsimile system 800a of the comparative example. As illustrated in FIG. 3, in the facsimile system 800a of the comparative example, upon receiving a broadcast facsimile server addressed e-mail, same as in the case of FIG. 2B, the mail server 200 stores two mail messages in the mailbox 203.

Figure 4:
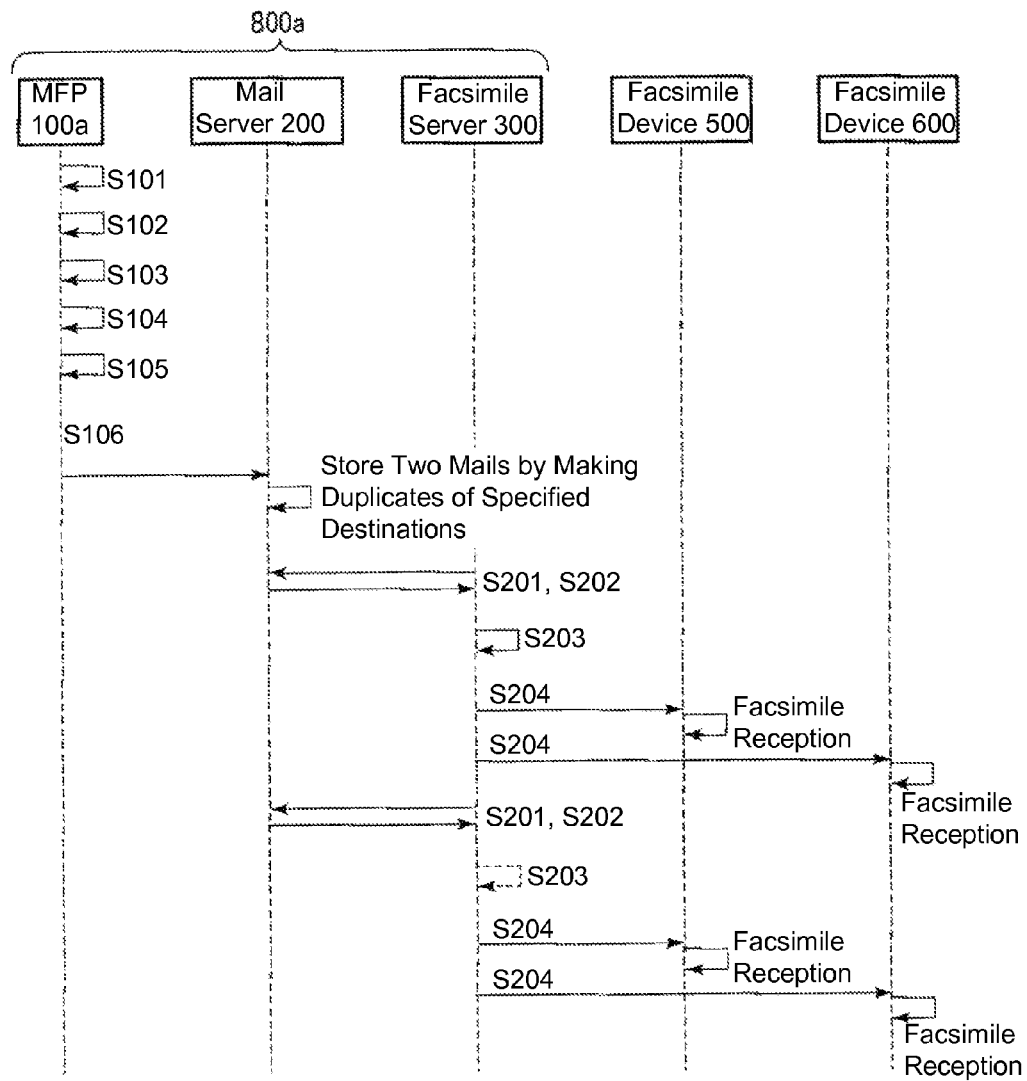
FIG. 4 is a sequence diagram illustrating broadcast facsimile server addressed transmission and broadcast FAX transmission to a plurality of facsimile devices in the facsimile system of the comparative example.

FIG. 4 is a sequence diagram illustrating a broadcast facsimile server addressed transmission and a broadcast FAX transmission to the plurality of the facsimile devices 500 and 600 in the facsimile system 800a of the comparative example. Same as in the case of FIG. 2B, the facsimile system 800a of FIG. 4 performs a broadcast FAX transmission according to two facsimile server addressed e-mails. As illustrated in FIG. 4, when the broadcast FAX transmission is performed by the facsimile system 800a of the comparative example, a user loads a manuscript in an image reading unit of the MFP 100a, specifies a transmission destination (recipient) using a telephone number and the like, and performs an execution request of a facsimile server addressed transmission (S101). Then, the MFP 100a performs reading of the manuscript (S102), conversion of image data obtained by the reading (S103), and generation and transmission of an e-mail having mail addresses of "05@faxsvr.com" and "06@faxsvr.com" (S104 and S105). The MFP 100a performs communication with the mail server 200 via the network 400 by using the SMTP, specifies transmission destinations as "05@faxsvr.com" and "06@faxsvr.com" by using a RCPT command of the SMTP, and performs transmission of a generated e-mail (S106).

In this case, as illustrated in the "case of a plurality of destinations" of FIG. 2B, based on the setting of the mail server 200, the mail server 200 stores two e-mails in the mailbox for the facsimile server 300 by making two duplicate e-mails. Herein, the number of the duplicate emails is the same as the number of the mail addresses "05@faxsvr.com" and "06@faxsvr.com" that are specified as the transmission destinations.

Thereafter, the facsimile server 300 receives a first e-mail from the mailbox (S201-S203), and performs a broadcast FAX transmission to the facsimile devices 500 and 600 of the transmission destination telephone numbers included in the e-mail (S204). Further, the facsimile server 300 receives a second e-mail from the mailbox (S201-S203), and performs a broadcast FAX transmission to the facsimile devices 500 and 600 of the transmission destination telephone numbers included in the e-mail (S204). For this reason, in the facsimile system 800a of the comparative example, two facsimile images of the same content are transmitted to each of the facsimile device 500 and the facsimile device 600.

<<2>> First Embodiment

<<2.1>> Configuration of First Embodiment

Figure 5:
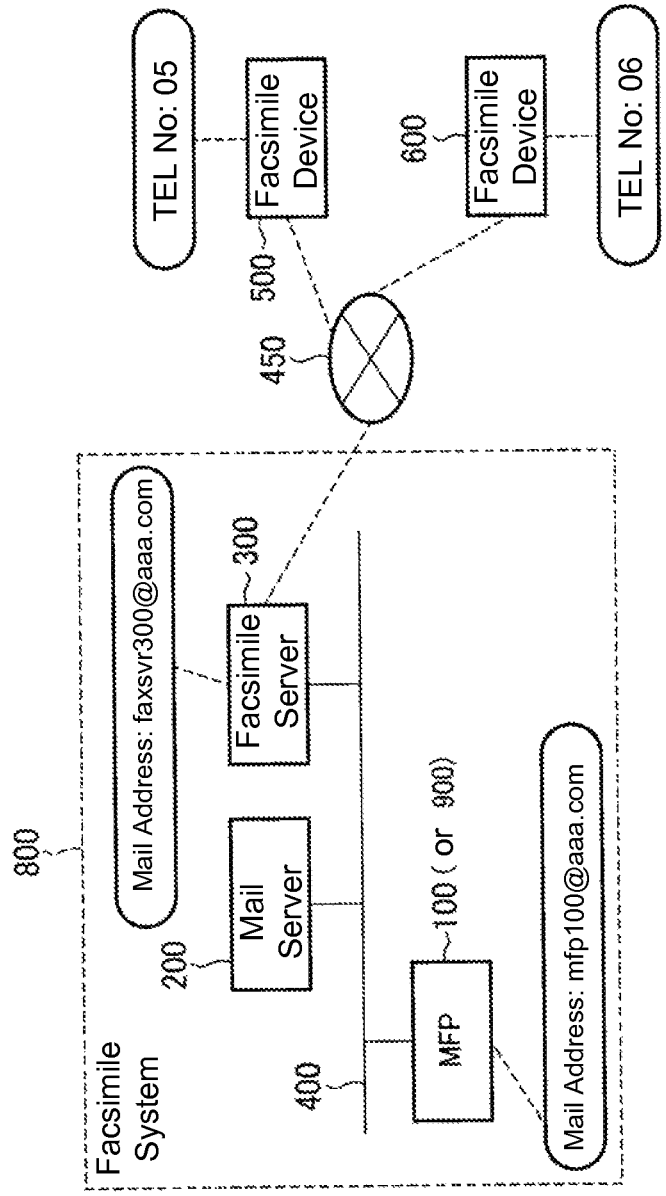
FIG. 5 illustrates a facsimile system according to a first embodiment and a second embodiment of the present application and facsimile devices as FAX transmission destinations.

FIG. 5 illustrates a facsimile system 800 according to a first embodiment and the facsimile devices 500 and 600 as the FAX transmission destinations. In FIG. 5, a configuration that is the same as or corresponding to a configuration illustrated in FIG. 1 is given the same reference numeral. As illustrated in FIG. 5, the facsimile system 800 according to the first embodiment includes a multifunctional peripheral (MFP) 100 (for example, having a mail address "mfp100@aaa.com") as a communication device, the mail server 200, and the facsimile server 300 (for example, having a mail address "faxsvr300@aaa.com"). The MFP 100, the mail server 200 and the facsimile server 300 are network-connected by a network (NET) 400 such as a local area network (LAN) or a wide area network (WAN), and are capable of communicating with each other using protocols such as transmission control protocol/internet protocol (TCP/IP). The facsimile server 300 is provided with a FAX modem board capable of transmitting and receiving facsimile (FAX) data and is connected to the public telephone network 450 via the FAX modem board. For example, the facsimile device 500 (for example, having a telephone number "05") and the facsimile device 600 (for example, having a telephone number "06") are connected to the public telephone network 450. The facsimile devices 500 and 600 are each capable of communicating with the facsimile system 800 via the public telephone network 450. In FIG. 5, the two servers are connected to the network 400. However, another server (for example, another facsimile server) may be further provided. Further, in FIG. 5, the mail server 200 and the facsimile server 300 are illustrated as separate devices. However, the mail server 200 and the facsimile server 300 are not necessarily separate devices, but may be configured as different parts within one device. Further, in FIG. 5, the two facsimile devices 500 and 600 are illustrated. However, the number of communication capable facsimile devices is not limited to two, but may be three or more.

Figure 6:
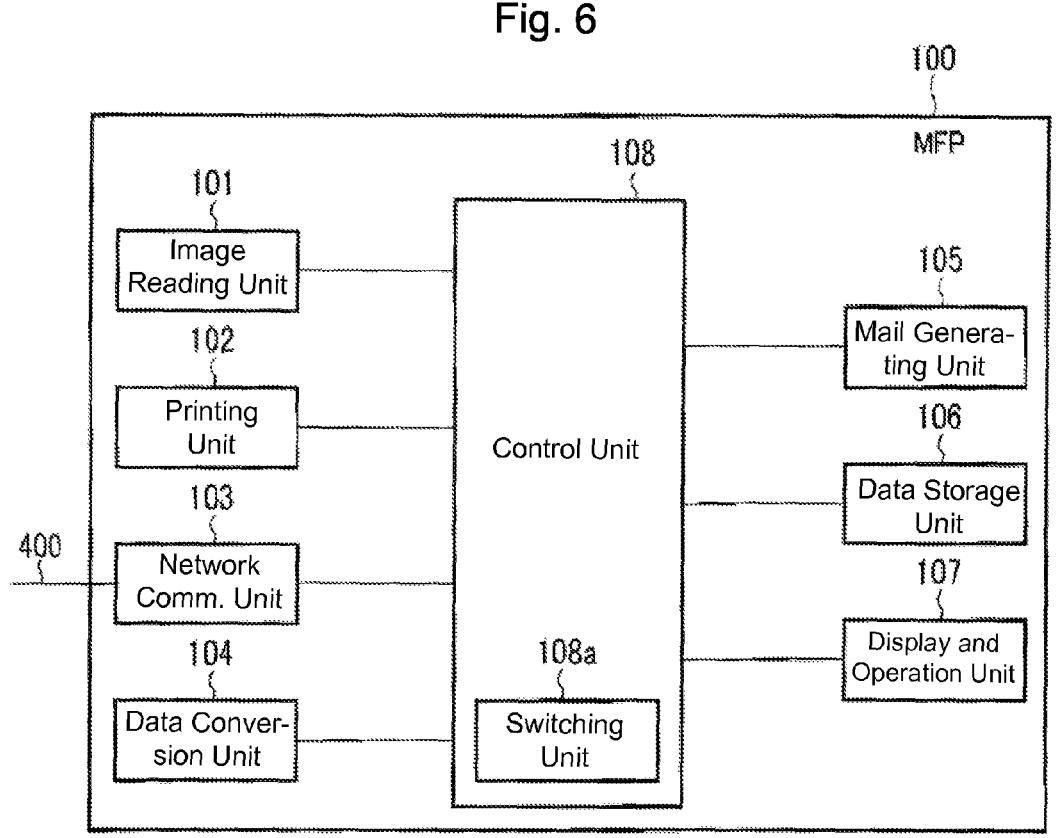
FIG. 6 is a block diagram schematically illustrating a configuration of an MFP as a communication device according to the first embodiment.

FIG. 6 is a block diagram schematically illustrating a configuration of the MFP 100 as the communication device according to the first embodiment. As illustrated in FIG. 6, the MFP 100 includes an image reading unit (image input unit) 101, a printing unit 102, a network communication unit (communication unit) 103, a data conversion unit 104, a mail generating unit 105, a data storage unit 106, a display and operation unit (input unit) 107, and a control unit 108.

The image reading unit 101, for example, optically reads a manuscript by using an imaging element, the manuscript being placed on a platen glass or conveyed to a reading position by an automatic document feeder, and outputs image data. The image reading unit 101, for example, is a scanner provided to the MFP 100. However, the image reading unit 101 may have a different configuration as far as the image reading unit 101 can optically read a reading target and generate image data based on a read image.

The printing unit 102 interprets print data described using a page description language and prints an image on a medium such as a recording sheet. The printing unit 102, for example, adopts an electrophotographic recording system and forms the image on the medium by using toner. The print data, for example, is data in a PostScript format using PostScript as the page description language.

The network communication unit 103 is connected to the network 400 and transmits and receives data by using network protocols. For example, when an e-mail is transmitted from the MFP 100, the network communication unit 103 performs processing as a simple mail transfer protocol (SMTP) client.

The data conversion unit 104 performs file format conversion processing. For example, the data conversion unit 104 converts data in a tagged image file format (TIFF) format to data in a PostScript format, and converts image data of a manuscript read by the image reading unit 101 to data in a TIFF format.

The mail generating unit 105 generates data capable of being transmitted as an e-mail. When an image file is transmitted from the MFP 100 by using an e-mail, for example, the mail generating unit 105 generates data in an e-mail format with the image file to be transmitted as an attached file.

The data storage unit 106 includes a data storage device such as a semiconductor memory or a hard disk, stores, for example, data such as setting values for the MFP 100, and performs management of data modification and deletion and the like. Further, the data storage unit 106 manages, as the setting values for the MFP 100, information such as a host name or an IP address of the mail server (the mail server 200 in FIG. 5) that communicates in order for the network communication unit 103 to perform transmission of an e-mail, and is set in advance by an administrator of the device.

The display and operation unit 107, which includes a display that displays information about status or menu of the MFP 100, provides a user with the status of the MFP 100. A user can use the display and operation unit 107 to input a request for an operation such as modifying the settings and executing a function of the MFP 100.

The control unit 108 controls the units 101-107 of the MFP 100. Further, the control unit 108 obtains or generates information about time used when the control of operations of the unites.

When a FAX transmission is performed by using the facsimile system 800, a user requests the MFP 100 to execute a facsimile server addressed transmission by using the display and operation unit 107 to perform operation for specifying a transmission destination telephone number that indicates a transmission destination of the FAX transmission. In the MFP 100 that has received the request, the image reading unit 101 creates image data by optically reading a manuscript; the data conversion unit 104 converts the image data created by the image reading unit 101 to an image file in a TIFF format; and the mail generating unit 105 generates data in a mail format by using the image file converted by the data conversion unit 104 and the transmission destination telephone number input by a user using the display and operation unit 107. Thereafter, the network communication unit 103 transmits the data in a mail format as facsimile server addressed e-mail. As described above, the MFP 100 is a facsimile server addressed transmission device provided with a function of transmitting a facsimile server addressed e-mail to the facsimile server 300 via the mail server 200.

Figure 7:
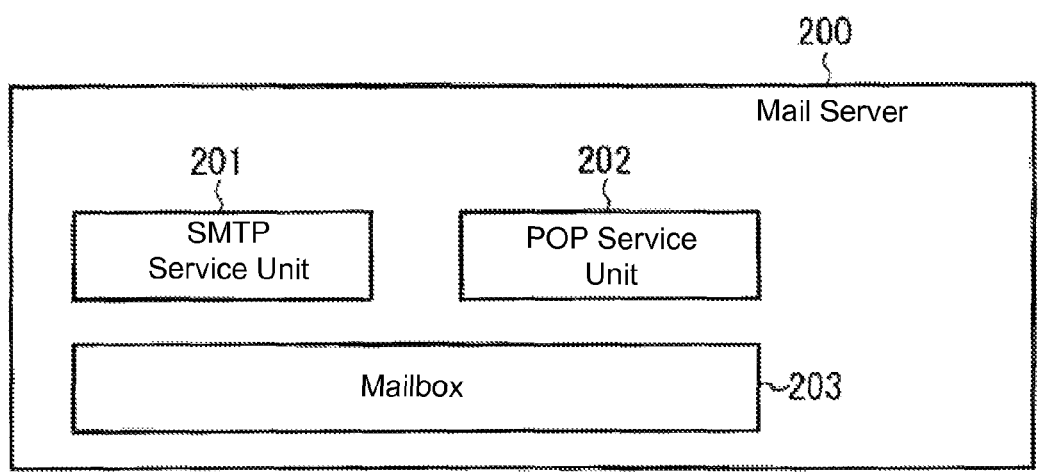
FIG. 7 is a block diagram schematically illustrating a main configuration of a mail server in the facsimile system according to the first embodiment.

FIG. 7 is a block diagram schematically illustrating a main configuration of the mail server 200. As illustrated in FIG. 7, the mail server 200 includes an SMTP service unit 201, a post office protocol (POP) service unit 202, and the mailbox 203.

The SMTP service unit 201 functions as an SMTP server and receives an e-mail transmission request from an SMTP client (for example, the MFP 100). An e-mail received by the SMTP service unit 201 from the SMTP client is stored and managed by the mailbox 203 as needed.

The POP service unit 202 functions as a POP server and receives an e-mail reception request from a POP client (for example, the facsimile server 300). When receiving an e-mail reception request, the POP service unit 202 transmits an e-mail stored in the mailbox 203 to the POP client.

Figure 8A:
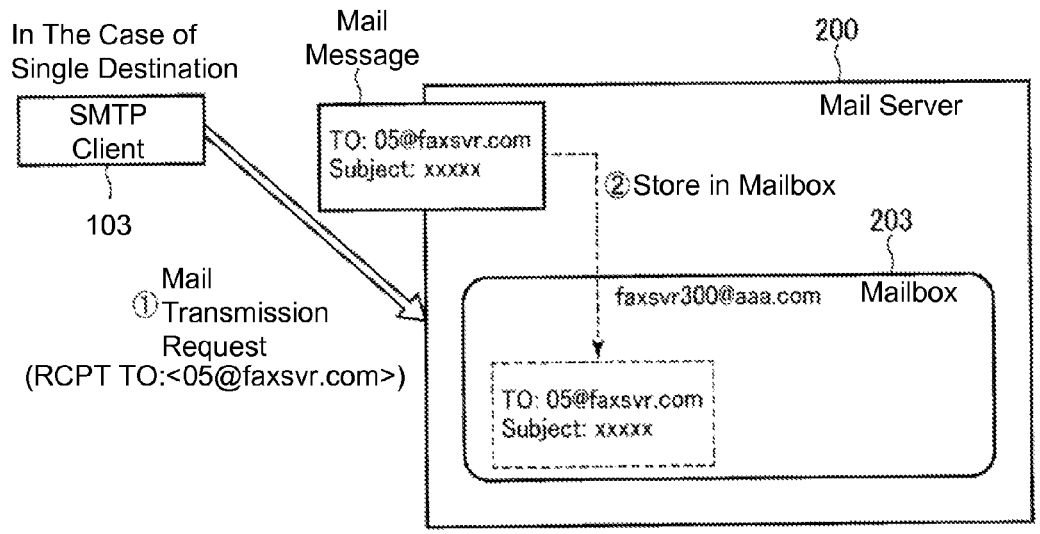
FIGS. 8A and 8B are explanatory diagrams illustrating storing operations of a facsimile server addressed e-mail in the facsimile system according to the first embodiment.
Figure 8B:
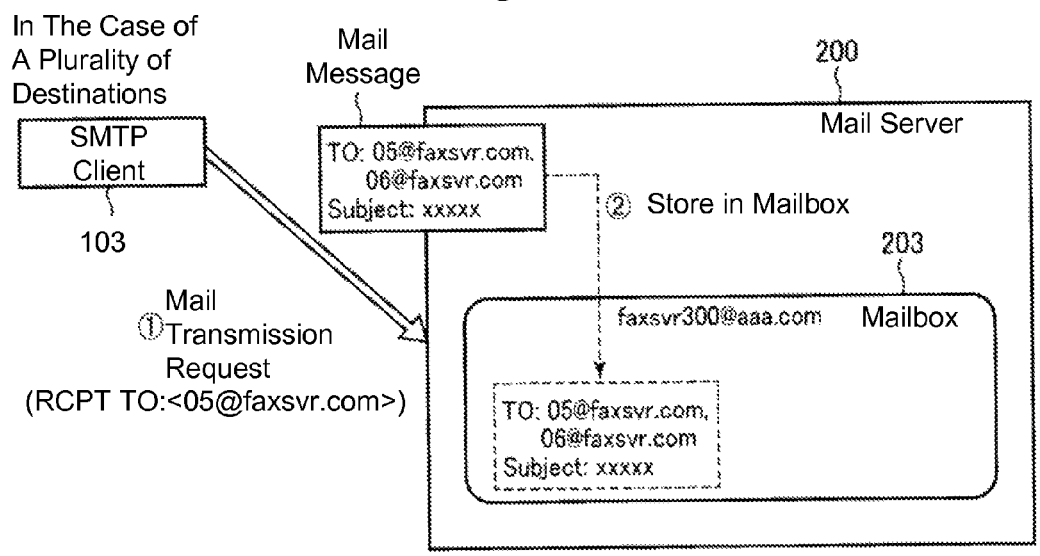

FIGS. 8A and 8B are explanatory diagrams illustrating storing operations of a facsimile server addressed e-mail in the mail server 200 of the facsimile system 800 according to the first embodiment. The SMTP service unit 201 of the mail server 200 has a function (referred to as a "catch-all" function or a "virtual domain" function) that, when an e-mail of a mail address that does not exists or an e-mail of a mail address of a preset domain name is received from an SMTP client, the e-mail is stored in the mailbox 203, which is specified by a setting value.

As illustrated in FIG. 8A, the mail server 200 is set in advance in such a manner that, when one facsimile server addressed e-mail of a mail address (for example, "05@faxsvr.com") with a domain name "faxsvr.com" is received from an SMTP client, the mail server 200 stores the e-mail in the mailbox 203 for the facsimile server 300 having the mail address "faxsvr300@aaa.com."

Further, as illustrated in FIG. 8B, the mail server 200 is set in advance in such a manner that, when a plurality of facsimile server addressed e-mails of mail addresses (for example, "05@faxsvr.com" and "06@faxsvr.com") with a domain name "faxsvr.com" are received from an SMTP client, the mail server 200 stores the e-mails in the mailbox 203 for the facsimile server 300 having the mail address "faxsvr300@aaa.com."

By these settings, all facsimile server addressed e-mails of the mail addresses with the domain name "faxsvr.com" that are received by the mail server 200 can be stored in the mailbox 203 for the facsimile server 300 having the mail address "faxsvr300@aaa.com," and the facsimile server 300 having the mail address "faxsvr300@aaa.com" can receive all facsimile server addressed e-mails of the mail addresses with the domain name "faxsvr.com" that are received by the mail server 200.

Further, when a transmission request of an e-mail specifying a plurality of transmission destination mail addresses with the domain name "faxsvr.com" is received from an SMTP client, the mail server 200 stores the same number of emails that are received as the number of the plurality of specified transmission destination in the mailbox 203 for the facsimile server 300 having the mail address "faxsvr300@aaa.com." For example, a SMTP server such as Postfix or qmail may have such functions of the mail server 200. In the first embodiment, the case where the SMTP client is the MFP 100 is explained.

The facsimile server 300 is provided with a function of a POP client and is capable of receiving e-mails. Further, the facsimile server 300 analyzes a value of the "To" field of a received e-mail, and, when a transmission destination telephone number is specified in a part before an "@" mark in a mail address and a file in a TIFF format is attached to the e-mail, the facsimile server 300 is capable of FAX transmission with the attached TIFF-format file as a transmission image to a telephone number specified from the public telephone network 450.

The facsimile device 500 and the facsimile device 600 are devices provided with FAX transmission and reception functions.

Figure 9:
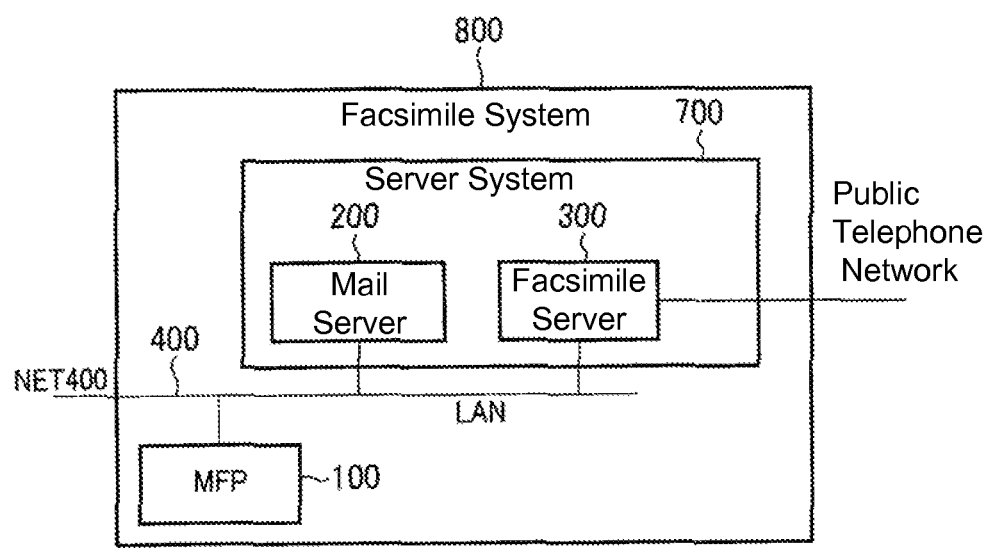
FIG. 9 is a block diagram schematically illustrating a configuration of the facsimile system according to the first embodiment.

FIG. 9 is a block diagram schematically illustrating a configuration of the facsimile system 800 according to the first embodiment. The facsimile system 800 illustrated in FIG. 9 is the same as the facsimile system 800 illustrated in FIG. 5 in terms of functionality. However, the facsimile system 800 illustrated in FIG. 9 is different from the facsimile system 800 illustrated in FIG. 5 in that the mail server 200 and the facsimile server 300 configure one server system 700. The MFP 100, the mail server 200 and the facsimile server 300 as a whole configure the one facsimile system 800 as illustrated in FIG. 9 by combining the functions of these devices to operate. Further, the mail server 200 and the facsimile server 300 configure the one server system 700.

In the above explanation, the case is explained in which the MFP 100, the mail server 200 and the facsimile server 300 are connected to a LAN and perform communication by using the TCP/IP. However, instead of the LAN, other network configurations such as the Internet may also be adopted. Further, the mail server 200 and the facsimile server 300 are separate devices. However, it is also possible to adopt one device provided with the functions of both the mail server 200 and the facsimile server 300.

Further, in the first embodiment, in order to have the facsimile server 300 perform a FAX transmission with the facsimile devices 500 and 600 as the transmission destinations, at the MFP 100, two telephone numbers of the facsimile devices 500 and 600 are specified and a broadcast facsimile server addressed transmission to the mail server 200 is performed. Operations in the case where the MFP 100 of the present application performs the broadcast facsimile server addressed transmission to the mail server 200 in a manner that duplicate FAX transmissions of the same content are not performed are explained next.

<<2.2>> Operation of First Embodiment

In the first embodiment, as an example, the case is explained where, in order to have the facsimile server 300 perform a FAX transmission with the facsimile devices 500 and 600 as the transmission destinations, the MFP 100 specifies two telephone numbers of the facsimile devices 500 and 600 and performs a broadcast facsimile server addressed transmission to the mail server 200.

Figure 10:
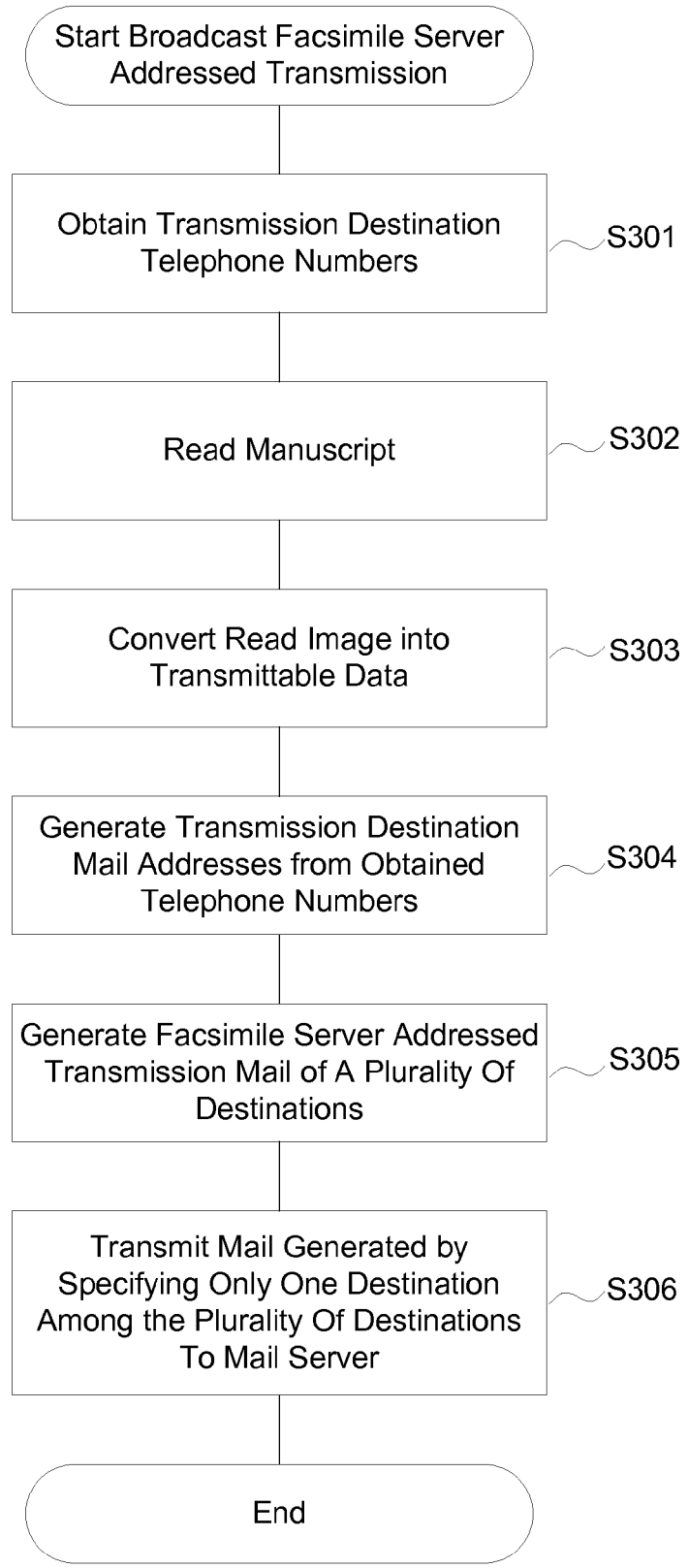
FIG. 10 is a flow diagram illustrating a broadcast facsimile server addressed transmission in the facsimile system according to the first embodiment.
Figure 11:
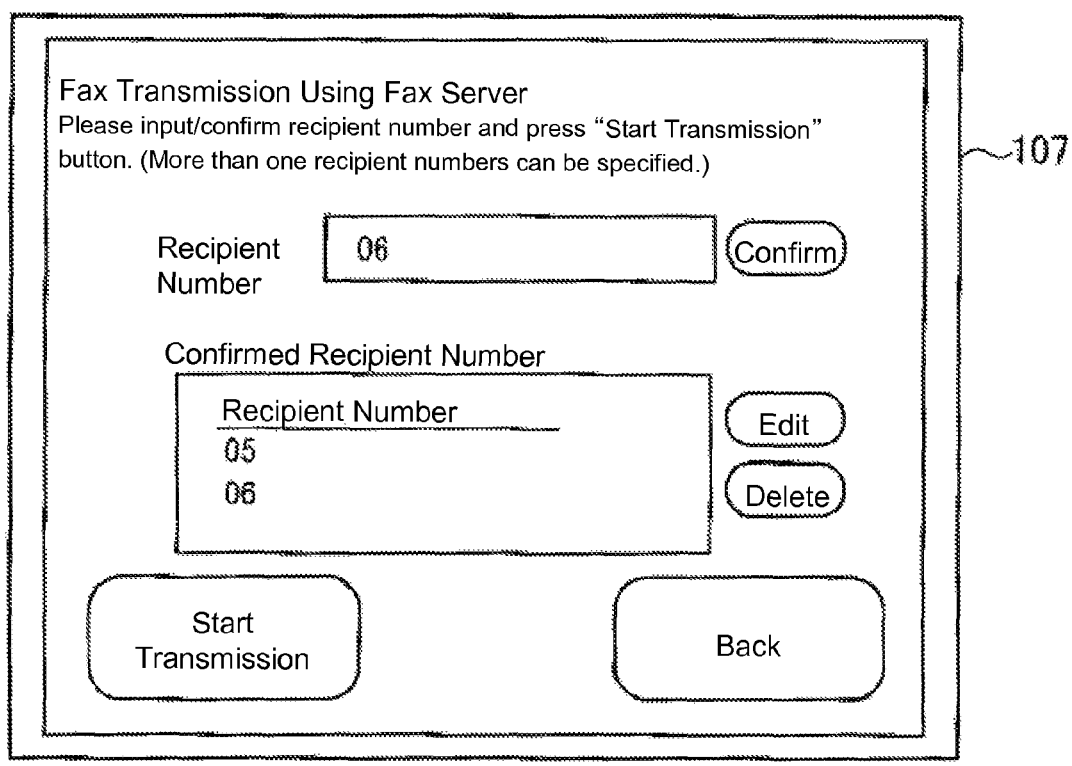
FIG. 11 illustrates an example of an input screen displayed in a display and operation unit when a broadcast facsimile server addressed transmission in the facsimile system according to the first embodiment is performed.
Figure 13:
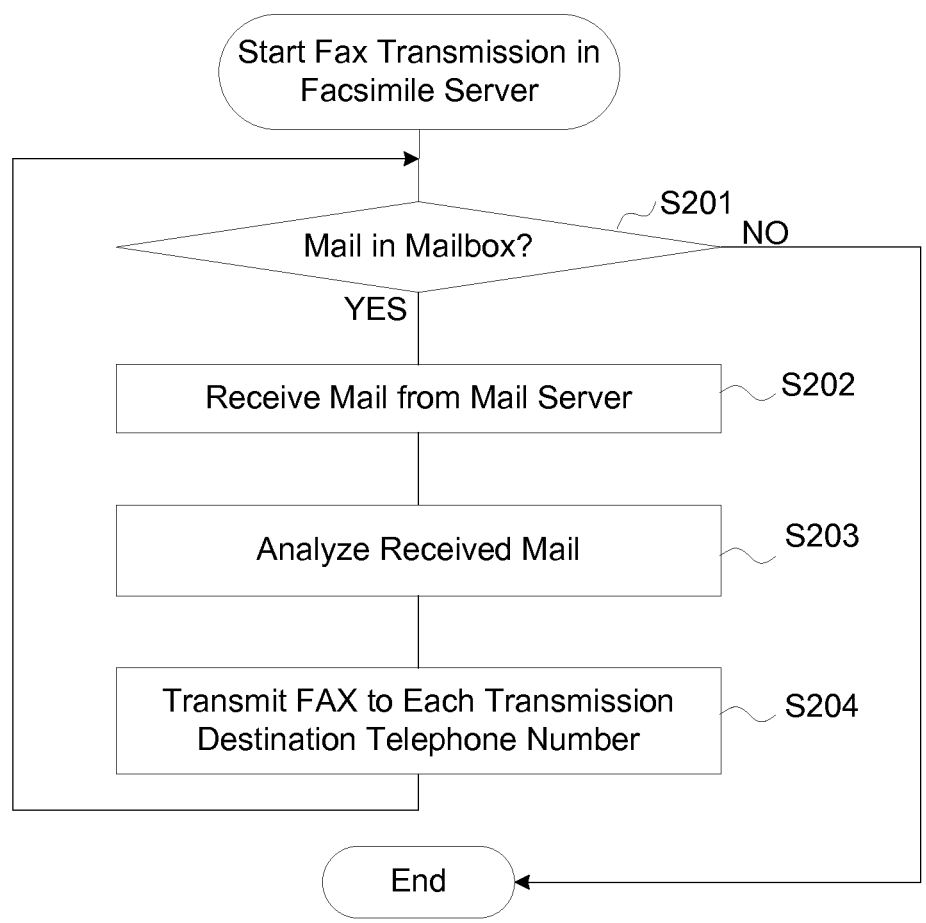
FIG. 13 is a flow diagram illustrating a FAX transmission by a facsimile server in the facsimile system according to the first embodiment.
Figure 14:
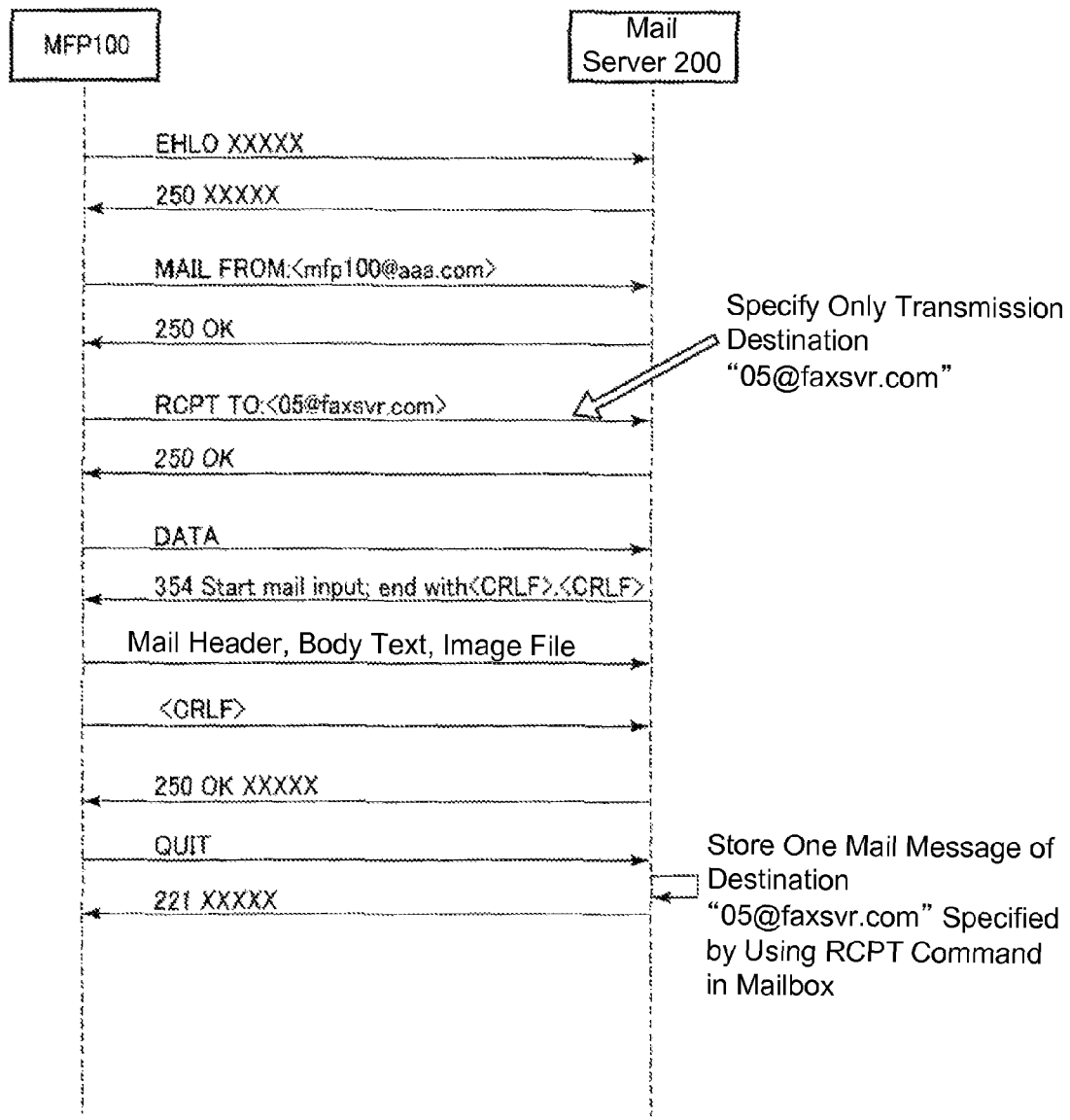
FIG. 14 is a sequence diagram illustrating a broadcast facsimile server addressed transmission in the facsimile system according to the first embodiment.
Figure 15:
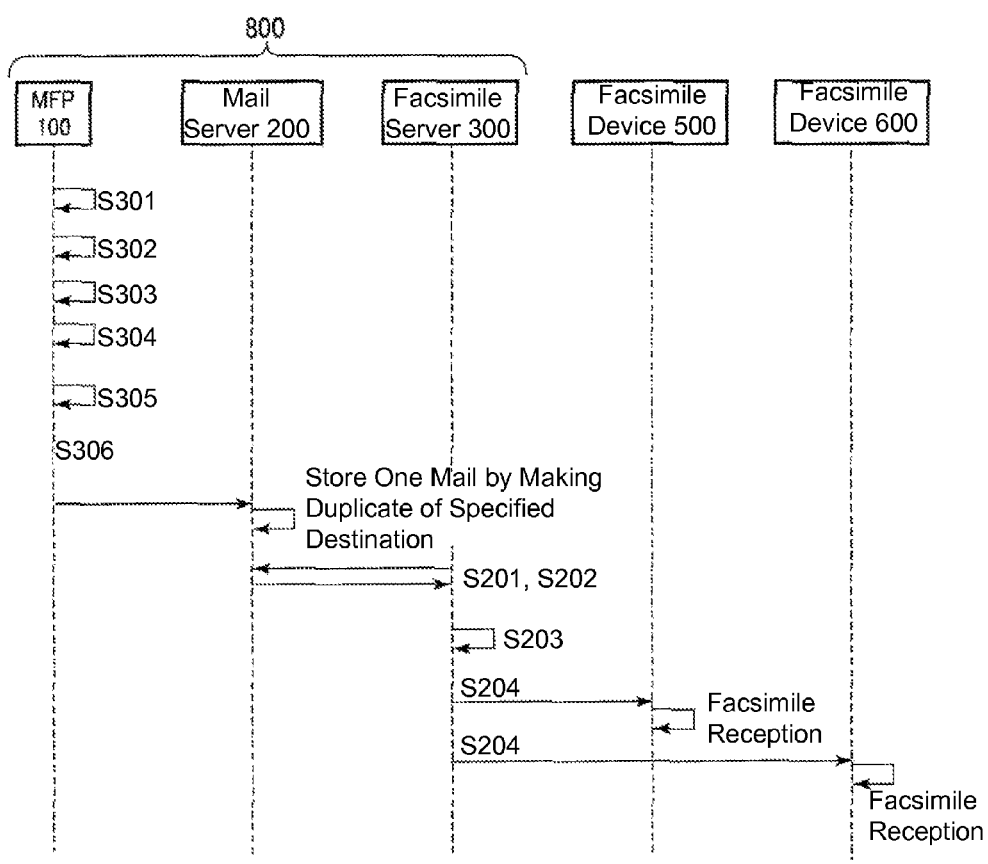
FIG. 15 is a sequence diagram illustrating a broadcast facsimile server addressed transmission and a broadcast FAX transmission to a plurality of facsimile devices in the facsimile system according to the first embodiment.

FIG. 10 is a flow diagram illustrating a broadcast facsimile server addressed transmission in the facsimile system 800 according to the first embodiment. Further, FIG. 11 illustrates an example of an input screen displayed in the display and operation unit 107 when a broadcast facsimile server addressed transmission is performed in the facsimile system 800 according to the first embodiment. Further, FIG. 12 illustrates an example of data in a mail format of a facsimile server addressed e-mail of which transmission destinations are "05@faxsvr.com" and "06@faxsvr.com" in the first embodiment. Further, FIG. 13 is a flow diagram illustrating a FAX transmission by the facsimile server 300 in the facsimile system 800 according to the first embodiment. Further, FIG. 14 is a sequence diagram illustrating a broadcast facsimile server addressed transmission in the facsimile system 800 according to the first embodiment. Further, FIG. 15 is a sequence diagram illustrating a broadcast facsimile server addressed transmission and a broadcast FAX transmission to the plurality of the facsimile devices 500 and 600 in the facsimile system 800 according to the first embodiment.

A user loads a manuscript to be transmitted in the image reading unit 101 of the MFP 100, specifies the telephone number "05" of the facsimile device 500 and the telephone number "06" of the facsimile device 600 as the transmission destinations by using the display and operation unit 107, and performs an execution request of a facsimile server addressed transmission (S301).

The image reading unit 101 optically reads the manuscript loaded in the image reading unit 101 and passes image data obtained by the reading to the data conversion unit 104 (S302).

The data conversion unit 104 converts the image data received from the image reading unit 101 into a file in a TIFF format, which is a data file in a format that can be FAX-transmitted by the facsimile server 300 (S303).

The mail generating unit 105 obtains a file in the TIFF format from the data conversion unit 104, the file being converted to perform a facsimile server addressed transmission, and, as illustrated in FIG. 12, generates data in a mail format of which the transmission destinations are "05@faxsvr.com" and "06@faxsvr.com" and to which the file in the TIFF format is attached (S304 and S305). Here, regarding the mail addresses of the transmission destinations "05@faxsvr.com" and "06@faxsvr.com," the MFP 100 has a setting (referred to as a "suffix setting") of a character string that is appended to the end of a specified telephone number in the data storage unit 106, the setting being as a setting of the facsimile server addressed transmission. The mail generating unit 105 obtains the character string "@faxsvr.com" of the suffix setting that is set in advance by an administrator of the MFP 100 from the data storage unit 106. The mail addresses "05@faxsvr.com" and "06@faxsvr.com" as the transmission destinations are generated based on the character string of the suffix setting and the user-specified telephone numbers of the facsimile device 500 and the facsimile device 600, and are specified in the data in the mail format.

The control unit 108 determines that a facsimile server addressed transmission is being executed and that the transmission is a broadcast facsimile server addressed transmission of which a plurality of destinations are specified; controls the network communication unit 103; has the network communication unit 103 perform communication as illustrated in FIG. 14 by using the SMTP via the mail server 200 and the network 400; and has the network communication unit 103 perform transmission of an e-mail that is generated by the mail generating unit 105 by specifying only "05@faxsvr.com" as a transmission destination by using a RCPT command of the SMTP (S306). In a case of performing transmission of other e-mails than the facsimile server addressed transmission, similar to the case where the MFP 100a of the comparative example performs the broadcast facsimile server addressed transmission to the mail server 200, the control unit 108 controls the network communication unit 103 to perform e-mail transmission by specifying a plurality of destinations.

After the MFP completes the facsimile server addressed transmission, as illustrated in the "case of single destination" in FIG. 8A, the mail server 200 stores one facsimile server addressed e-mail that is transmitted by the MFP 100 and has the mail address "05@faxsvr.com" specified as the transmission destination in the mailbox for the facsimile server 300 having the mail address "faxsvr300@aaa.com" based on the setting of the mail server 200. Herein, the mail address "05@faxsver.com" is specified as the transmission destination because the domain name of the mail address of the transmission destination specified in the e-mail transmission request from the MFP 100 is "faxsvr.com."

Next, referring to FIG. 13, operations in the case where the facsimile server 300 receives the facsimile server addressed e-mail transmitted by the MFP 100 from the mailbox for the facsimile server 300 having the mail address "faxsvr300@aaa.com", and performs a FAX transmission are explained.

The facsimile server 300 performs communication with the mail server 200 via the network 400 by using the POP, and receives the facsimile server addressed e-mail that is transmitted by the MFP 100 and is stored in the mailbox for the facsimile server 300 having the mail address "faxsvr300@aaa.com" (S201 and S202).

Next, the facsimile server 300 analyzes the received e-mail. Specifically, as illustrated in FIG. 12, the facsimile server 300 analyzes the telephone number specified in the part before the "@" mark of the mail address in the "To" field and the attached file in the TIFF format (S203).

Next, based on the value of the "To" field of the received e-mail, the facsimile server 300 performs FAX transmission using the file in the TIFF format as a transmission image to the telephone number "05" of the facsimile device 500 and the telephone number "06" of the facsimile device 600 (S204).

In the first embodiment, only one e-mail of the content illustrated in FIG. 12 is stored in the mailbox for the facsimile server 300 having the mail address "faxsvr300@aaa.com." Therefore, different from the case where the MFP 100a of the above-described comparative example performs the broadcast facsimile server addressed transmission to the mail server 200, an e-mail of the same content is not repeatedly received, and the FAX transmission of the same content to the facsimile device 500 and the facsimile device 600 is not repeatedly performed (S201).

Therefore, the facsimile device 500 receives only once the facsimile transmission data having the image data transmitted from the MFP 100 to the facsimile server as the received image; and the facsimile device 600 receives only once the facsimile transmission data having the image data transmitted from the MFP 100 to the facsimile server as the received image.

Further, as the processing method of the case of performing a broadcast facsimile server addressed transmission, one of the processing method of FIGS. 10-15 and the processing method of FIGS. 1-4 may be selected. For example, a switching unit (selection unit) (108a in FIG. 6) for the transmission method of the broadcast facsimile server addressed transmission may be provided in the control unit 108. An administrator may be able to switch the transmission method of the broadcast facsimile server addressed transmission of the MFP 100 according to the environment of the facsimile system including the mail server 200 or the facsimile server 300.

<<2.3>> Effect of First Embodiment

As described above, according to the first embodiment, even when the mail server 200 is a mail server that makes the same number of duplicate e-mails as the number of the specified transmission destinations and stores the received e-mails in the mailbox in the case where the mail server 200 receives a transmission request of an e-mail in which a plurality of transmission destination mail addresses are specified, the MFP 100 performs transmission request of an e-mail that specifies only one transmission destination mail address when performing a broadcast facsimile server addressed transmission to the mail server 200. Therefore, it is possible that FAX transmissions of duplicate contents from the facsimile server 300 are not performed.

<<3>> Second Embodiment

<<3.1>> Configuration of Second Embodiment

Figure 16:
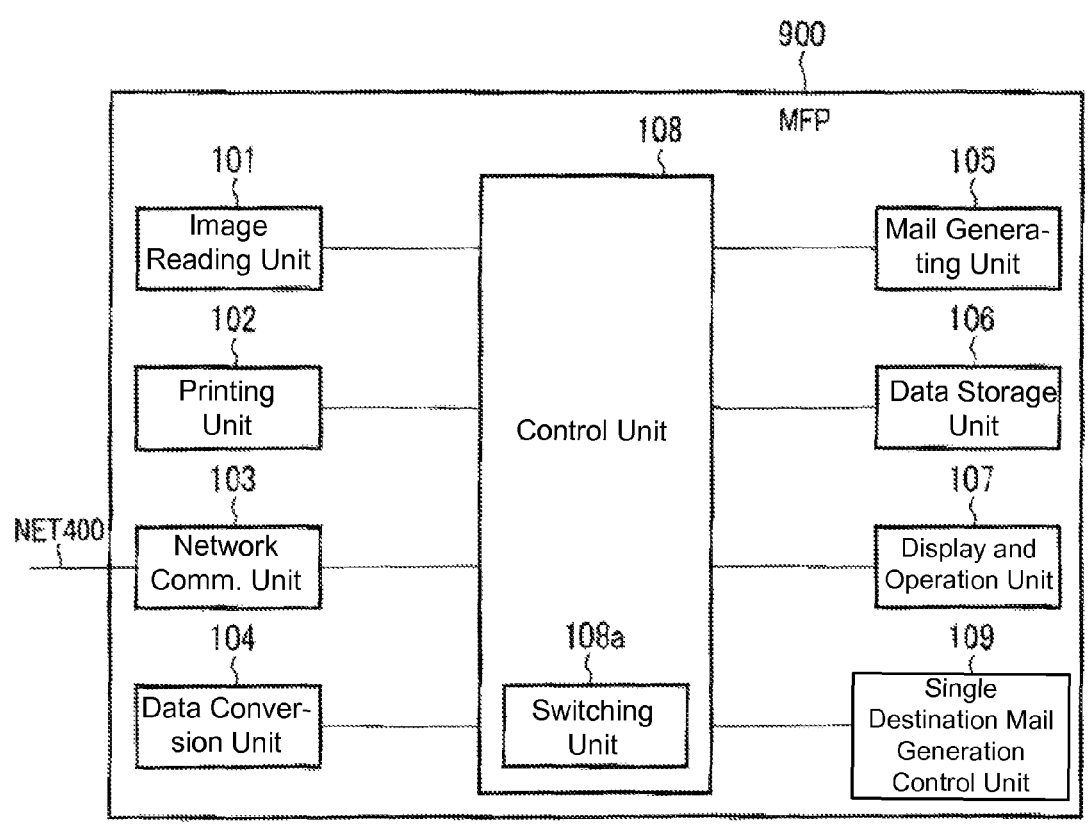
FIG. 16 is a block diagram schematically illustrating a configuration of an MFP as a communication device according to the second embodiment.

FIG. 16 is a block diagram schematically illustrating a configuration of an MFP 900 as a communication device according to a second embodiment. In FIG. 16, a configuration that is the same as or corresponding to a configuration illustrated in FIG. 6 is given the same reference numeral. As illustrated in FIG. 16, the MFP 900 is different from the MFP 100 illustrated in FIG. 6 in that the MFP 900 includes a single destination mail generation control unit 109. When performing a broadcast facsimile server addressed transmission, the MFP 900 according to the second embodiment generates data for an e-mail in a mail format of a single destination for each transmission destination, and transmits the same number of facsimile server addressed e-mails as the number of transmission destinations.

A network configuration of the second embodiment is the same as the first embodiment illustrated in FIG. 5. Therefore, for the explanation of the second embodiment, FIG. 5 is also referenced. In the second embodiment, the MFP 900, the mail server 200 and the facsimile server 300 as a whole configure the one facsimile system 800 as illustrated in FIG. 9, the MFP 900 being a facsimile server addressed transmission device. Further, in the second embodiment, FIGS. 11-14 that are used in the explanation of the first embodiment are also referred.

In the above explanation, the MFP 900, the mail server 200 and the facsimile server 300 are connected to a LAN and perform communication by using the TCP/IP. However, instead of the LAN, other network configurations such as the Internet may also be adopted. Further, the mail server 200 and the facsimile server 300 are separate devices. However, it is also possible to adopt one device provided with the functions of both the mail server 200 and the facsimile server 300.

<<3.2>> Operation of Second Embodiment

In the second embodiment, an operation is explained in which, when two telephone numbers of the facsimile device 500 and the facsimile device 600 are specified as transmission destination telephone numbers at the MFP 900 in order to perform FAX transmission from the facsimile server 300 to the facsimile device 500 and the facsimile device 600, an e-mail of a single transmission destination is generated for each of the telephone numbers of the facsimile device 500 and the facsimile device 600, and facsimile server addressed transmission to the mail server 200 are performed for a plurality of times.

Figure 17:
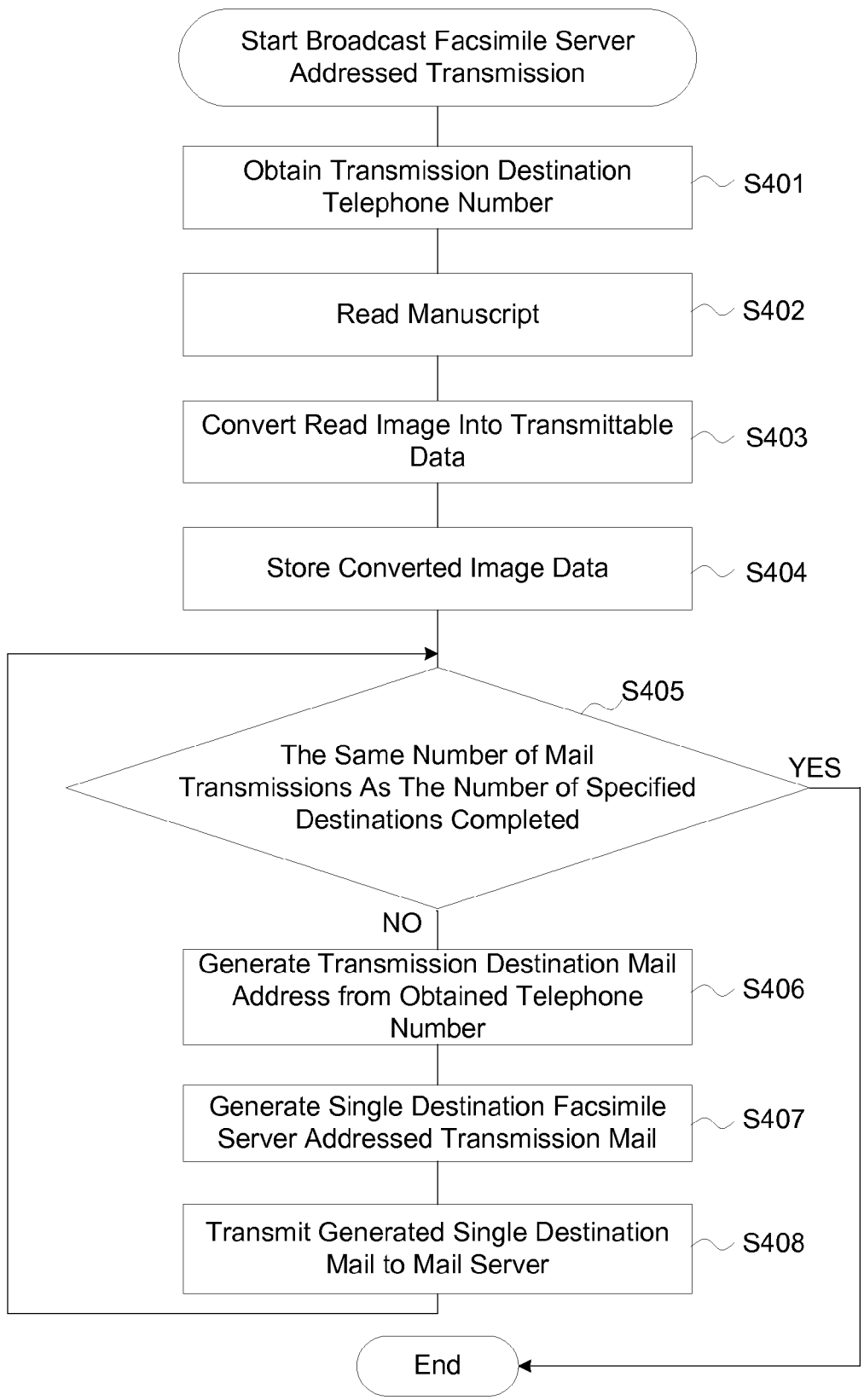
FIG. 17 is a flow diagram illustrating a broadcast facsimile server addressed transmission in the facsimile system according to the second embodiment.
Figure 18:
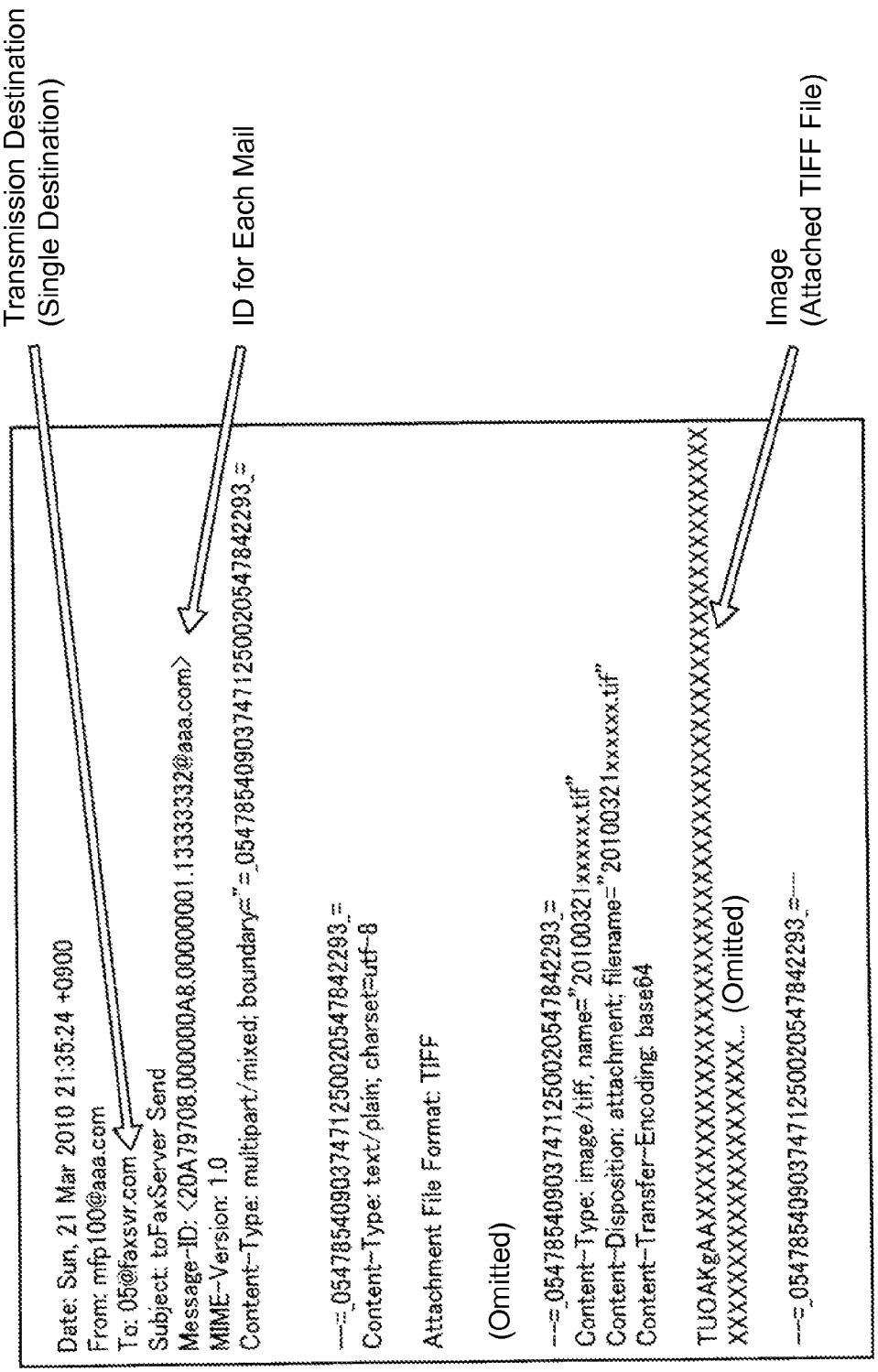
FIG. 18 illustrates an example of data in a mail format of a facsimile server addressed e-mail of which a transmission destination is "05@faxsvr.com" in the second embodiment.

FIG. 17 is a flow diagram illustrating a broadcast facsimile server addressed transmission in the facsimile system 800 according to the second embodiment. Further, FIG. 18 illustrates an example of data in a mail format of a facsimile server addressed e-mail of which a transmission destination is "05@faxsvr.com" in the second embodiment. Further, FIG. 19 illustrates an example of data in a mail format for a facsimile server addressed e-mail of which a transmission destination is "06@faxsvr.com" in the second embodiment. Further, FIG. 20 is a sequence diagram illustrating a broadcast facsimile server addressed transmission and a broadcast FAX transmission to the plurality of the facsimile devices 500 and 600 in the facsimile system 800 according to the second embodiment.

A user loads a manuscript to be transmitted to the facsimile server in the image reading unit 101 of the MFP 900, specifies the telephone number "05" of the facsimile device 500 and the telephone number "06" of the facsimile device 600 as the transmission destinations (recipients) by using the display and operation unit 107, and performs an execution request of a facsimile server addressed transmission (S401). In this case, an operation screen as illustrated in FIG. 11 that allows input of a telephone number as a transmission destination of the facsimile is displayed in the display and operation unit 107. Similar to the first embodiment, a user only needs to input a telephone number in the same way as the case of a FAX transmission, and does not need to mind a mail address.

The image reading unit 101 optically reads the manuscript that has been loaded and passes image data obtained by the reading to the data conversion unit 104 (S402).

The data conversion unit 104 converts the image data received from the image reading unit 101 into a file in a TIFF format, which is a data file in a format that can be FAX-transmitted by the facsimile server 300 (S403).

The data storage unit 106 temporarily stores the file in the TIFF format converted by the data conversion unit 104 (S404).

The single destination mail generation control unit 109 determines that a facsimile server addressed transmission is being executed and that the transmission is a facsimile server addressed transmission of which a plurality of destinations are specified; controls the mail generating unit 105; has the mail generating unit 105 obtain via the data storage unit 106 the file in the TIFF format that is converted by the data conversion unit 104 to perform the facsimile server addressed transmission; and has the mail generating unit 105 generate data sets in mail formats, each of the data sets having a single transmission destination and having the file in the TIFF format attached, the transmission destinations of the data sets being respectively "05@faxsvr.com" and "06@faxsvr.com" as illustrated in FIGS. 18 and 19 (S405, S406 and S407). In the case of performing transmission of other e-mails than the facsimile server addressed transmission, the single destination mail generation control unit 109 controls the mail generating unit 105 to generate a broadcast e-mail as illustrated in FIG. 12 in which a plurality of transmission destinations are collectively specified.

Similar to the first embodiment, regarding the mail address of the transmission destination of "05@faxsvr.com" or "06@faxsvr.com," the suffix setting is stored in the data storage unit 106 as a setting of the facsimile server addressed transmission of the device. The mail generating unit 105 obtains the character string "@faxsvr.com" of the suffix setting that is set in advance by the administrator of the MFP 900 from the data storage unit 106. The mail address "05@faxsvr.com" or "06@faxsvr.com" as the transmission destination is generated based on the character string of the suffix setting and the user-specified telephone number of the facsimile device 500 or the facsimile device 600, and is specified in the data in the mail format.

Under the control of the control unit 108, the network communication unit 103 performs communication with the mail server 200 via the network 400 by using the SMTP, and performs e-mail transmission for each of the e-mails as illustrated in FIGS. 18 and 19 that are generated by the mail generating unit 105 (S408).

The e-mail generated by the mail generating unit 105 is an e-mail of a single transmission destination. Therefore, the network communication unit 103 performs communication with the mail server 200 by using the SMTP as illustrated in FIG. 14, and performs transmission of the e-mail illustrated in FIG. 18 by specifying "05@faxsvr.com" as the transmission destination by using the RCPT command of the SMTP. Further, also for the e-mail illustrated in FIG. 19 of which the transmission destination is "06@faxsvr.com," which is different from "05@faxsvr.com," the network communication unit 103 performs communication with the mail server 200 by using the SMTP the same as one illustrated in FIG. 14, and performs transmission of the e-mail.

When the facsimile server addressed transmission is performed by the MFP 900, as illustrated in the "case of single destination" in FIG. 8, the mail server 200 determines that the domain name of the mail address of the transmission destination specified in the e-mail transmission request from the MFP 900 is "faxsvr.com," based on the setting of the mail server 200, and, for each of the two e-mails illustrated in FIGS. 18 and 19, stores the facsimile server addressed e-mail transmitted by the MFP 900 in the mailbox for the facsimile server 300 having the mail address "faxsvr300@aaa.com."

Next, referring to FIG. 13, operations in the case where the facsimile server 300 receives the facsimile server addressed e-mail transmitted by the MFP 900 from the mailbox for the facsimile server 300 having the mail address "faxsvr300@aaa.com" and performs FAX transmission are explained.

The facsimile server 300 performs communication with the mail server 200 via the network 400 by using the POP, and receives the facsimile server addressed e-mail that is transmitted by the MFP 900 and is stored in the mailbox for the facsimile server 300 having the mail address "faxsvr300@aaa.com" (S201 and S202).

Next, the facsimile server 300 analyzes the received e-mail. Specifically, as illustrated in FIG. 12, the facsimile server 300 analyzes the telephone number specified in the part before the "@" mark of the mail address in the "To" field and the attached file in the TIFF format (S203).

Next, based on the value of the "To" field of the received e-mail, the facsimile server 300 performs FAX transmission using the file in the TIFF format as a transmission image to the telephone number "05" of the facsimile device 500 and the telephone number "06" of the facsimile device 600 (S204).

In the second embodiment, the e-mail of the content illustrated in FIG. 19 is also stored in the mailbox for the facsimile server 300 having the mail address "faxsvr300@aaa.com." Therefore, the facsimile server 300 performs communication with the mail server 200 by using the POP, receives also the facsimile server addressed e-mail illustrated in FIG. 19 that is transmitted by the MFP 900, performs processing in the same manner, and performs FAX transmission to the telephone number "06" of the facsimile device 600 based on the value of the "To" field of the received e-mail (S201 and S202).

Therefore, the facsimile device 500 and the facsimile device 600 receive only once the facsimile having the image data transmitted from the MFP 900 to the facsimile server as the received image.

In the above explanation, the operations are explained in which a plurality of single transmission destination e-mails are generated based on a plurality of specified recipient telephone numbers, and a plurality of facsimile server addressed transmissions to the mail server 200 are performed. However, when the broadcast facsimile server addressed transmission is performed, it is also possible to have a configuration in which a switching unit (selection unit) 108a is provided for selecting one of the transmission method of the second embodiment and the transmission method of the above-described comparative example or selecting one of the transmission method of the second embodiment, the transmission method of the above-described comparative example and the transmission method of the first embodiment, so that it is possible to switch between the operation methods. In this way, according to the processing method of the mail server 200, a suitable transmission method can be set.

<<3.3>> Effect of Second Embodiment

As described above, according to the second embodiment, even when the mail server 200 is a mail server that makes the same number of duplicate e-mails as the number of the specified transmission destinations and stores the received e-mails in the mailbox in the case where the mail server 200 receives a transmission request of an e-mail in which a plurality of transmission destination mail addresses are specified, and even when a plurality of recipient telephone numbers are specified in the case where the MFP 900 performs a broadcast facsimile server addressed transmission, an e-mail of a single transmission destination is generated for each recipient telephone number and transmission of the e-mails is performed. Therefore, it is possible that FAX transmissions of duplicate contents from the facsimile server 300 are not performed.

Further, even when the facsimile server 300 has an upper limit for the number of the mail addresses in the "To" field of a received e-mail as a restriction on an e-mail that can be received and processed, since the MFP 900 performs a facsimile server addressed transmission by dividing the facsimile server addressed transmission into single transmission destination e-mails, a user can specify a plurality of destinations to perform the facsimile server addressed transmission regardless of the restriction.

<<4>> Utilization Form

In the first and the second embodiments, the case is explained where the communication device is the MFP 100 or 900. However, the communication device may be another device such a copier, a facsimile device or a scanner as far as the device has an e-mail transmission function.

What is claimed is:
1. A communication device, comprising:
an input unit specifying a transmission destination telephone number that indicates a facsimile transmission destination;
a communication unit transmitting an e-mail to a specified server among servers that are connected to a network;
a mail generating unit generating a facsimile server addressed e-mail to which a facsimile server addressed mail address is given, that is a mail address containing one or more numbers of the transmission destination telephone numbers; and
a control unit, wherein
the control unit controls the mail generating unit and the communication unit in such a manner that, when a plurality of transmission destination telephone numbers are specified as the one or more numbers of the transmission destination telephone numbers by the input unit,
the mail generating unit generates a facsimile server addressed e-mail to which a facsimile server addressed mail address is given, that contains the plurality of the transmission destination telephone numbers, and
the communication unit transmits the facsimile server addressed e-mail generated by the mail generating unit to a facsimile server, which is regarded as the specified server, as a destination fewer times than the number of the plurality of the transmission destination telephone numbers.

2. The communication device according to claim 1, wherein
the fewer times that the communication unit transmits the facsimile server addressed e-mail is one.

3. The communication device according to claim 1, further comprising:
a selection unit selecting one of a first communication operation and a second communication operation, the first communication operation operating in such a manner that the facsimile server addressed e-mail with the facsimile server as the destination is transmitted fewer times than the number of the plurality of the transmission destination telephone numbers, and the second communication operation operating in such a manner that the facsimile server addressed e-mail with the facsimile server as the destination is transmitted the same number of times as the number of the plurality of the transmission destination telephone numbers, wherein
the selection unit selects one of the first communication operation and the second communication operation based on an instruction from the control unit.

4. The communication device according to claim 1, further comprising:
an image input unit inputting an image, wherein
the control unit attaches the input image to the facsimile server addressed e-mail.

5. A communication device, comprising:
an input unit specifying a transmission destination telephone number that indicates a facsimile transmission destination;
a communication unit transmitting an e-mail to a server among servers that are connected to a network;
a single destination mail generation control unit generating a facsimile server addressed e-mail to which a facsimile server addressed mail address is given, that is a mail address containing one number of the transmission destination telephone number; and
a control unit, wherein
the control unit controls the single destination mail generation control unit and the communication unit in such a manner that, when a plurality of transmission destination telephone numbers are specified by the input unit,
the single destination mail generation control unit generates a plurality of facsimile server addressed e-mails respectively corresponding to the plurality of the transmission destination telephone numbers, each of the plurality of the facsimile server addressed e-mails being given a facsimile server addressed mail address containing one of the plurality of the transmission destination telephone numbers, and
the communication unit transmits the plurality of the facsimile server addressed e-mails generated by the single destination mail generation control unit to a facsimile server as the specified server as a destination.

6. The communication device according to claim 5, further comprising:
a selection unit selecting one of a first communication operation and a second communication operation, the first communication operation operating in such a manner that the single destination mail generation control unit generates the plurality of the facsimile server addressed e-mails respectively corresponding to the plurality of the transmission destination telephone numbers, each of the plurality of the facsimile server addressed e-mails being given a facsimile server addressed mail address containing one of the plurality of the transmission destination telephone numbers, and the communication unit transmits the plurality of the facsimile server addressed e-mails generated by the single destination mail generation control unit to the facsimile server as a server destination, and the second communication operation operating in such a manner that the facsimile server addressed e-mail with the facsimile server as the destination is transmitted the same number of times as the number of the plurality of the transmission destination telephone numbers, wherein
the selection unit selects one of the first communication operation and the second communication operation based on an instruction from the control unit.

7. The communication device according to claim 5, further comprising:
an image input unit inputting an image, wherein
the control unit attaches the input image to the facsimile server addressed e-mail.

8. A communication device, comprising:
an image input unit inputting an image;
an input unit specifying a transmission destination telephone number that indicates a transmission destination of the image;
a communication unit transmitting an e-mail to a specified server among servers that are connected to a network;
a mail generating unit generating a server addressed e-mail to which a server addressed mail address is given, that is a mail address containing one or more numbers of the transmission destination telephone numbers; and
a control unit, wherein
the control unit controls the mail generating unit and the communication unit in such a manner that, when the one or more numbers of the transmission destination telephone numbers are specified by the input unit,
the mail generating unit generates a server addressed e-mail that has the image attached thereto and to which a server addressed mail address is given, that contains the one or more numbers of the transmission destination telephone numbers, and
the communication unit transmits one copy of the server addressed e-mail generated by the mail generating unit to the specified server as a destination.

9. A communication device, comprising:
an image input unit inputting an image;
an input unit specifying a transmission destination telephone number that indicates a transmission destination of the image;
a communication unit transmitting an e-mail to a specified server among servers that are connected to a network;
a mail generating unit generating a server addressed e-mail to which a server addressed mail address is given, that is a mail address containing one or more numbers of the transmission destination telephone numbers; and
a control unit, wherein
the control unit controls the mail generating unit and the communication unit in such a manner that, when a plurality of transmission destination telephone numbers are specified as the one or more numbers of the transmission destination telephone numbers by the input unit,
the mail generating unit generates a server addressed e-mail that has the image attached thereto and to which a server addressed mail address is given, that contains the plurality of the transmission destination telephone numbers, and
the communication unit transmits the server addressed e-mail generated by the mail generating unit to the specified server as a destination fewer times than the number of the plurality of the transmission destination telephone numbers.

10. A facsimile system, comprising:
a mail server capable of transmitting and receiving an e-mail via a network and storing a received e-mail;
a facsimile server capable of facsimile transmission to an external device based on an e-mail received from the mail server via the network; and
a communication device generating a facsimile server addressed e-mail for having the facsimile server perform facsimile transmission, wherein
the communication device, comprising:
  an input unit for specifying a transmission destination telephone number that indicates a facsimile transmission destination;
  a communication unit transmitting an e-mail to a specified server among servers that are connected to a network;
  a mail generating unit generating a facsimile server addressed e-mail to which a facsimile server addressed mail address is given, that is a mail address containing one or more of the transmission destination telephone numbers; and
  a control unit,
the control unit controls the mail generating unit and the communication unit in such a manner that, when a plurality of transmission destination telephone numbers are specified as the one or more numbers of the transmission destination telephone numbers by the input unit,
the mail generating unit generates a facsimile server addressed e-mail to which a facsimile server addressed mail address is given, that contains the plurality of the transmission destination telephone numbers, and
the communication unit transmits the facsimile server addressed e-mail generated by the mail generating unit to a facsimile server as the specified server as a destination fewer times than the number of the plurality of the transmission destination telephone numbers.

11. A facsimile system, comprising:
a mail server capable of transmitting and receiving an e-mail via a network and storing a received e-mail;
a facsimile server capable of facsimile transmission to an external device based on an e-mail received from the mail server via the network; and
a communication device generating a facsimile server addressed e-mail for having the facsimile server to perform facsimile transmission, wherein
the communication device, comprising:
  an input unit for specifying a transmission destination telephone number that indicates a facsimile transmission destination;
  a communication unit transmitting an e-mail to a specified server among servers that are connected to a network;
  a single destination mail generation control unit generating a facsimile server addressed e-mail to which a facsimile server addressed mail address is given, that is a mail address containing one transmission destination telephone number; and
  a control unit,
the control unit controls the single destination mail generation control unit and the communication unit in such a manner that, when a plurality of transmission destination telephone numbers are specified by using the input unit,
the single destination mail generation control unit generates a plurality of facsimile server addressed e-mails respectively corresponding to the plurality of the transmission destination telephone numbers, each of the plurality of the facsimile server addressed e-mails being given a facsimile server addressed mail address containing one of the plurality of the transmission destination telephone numbers, and
the communication unit transmits the plurality of the facsimile server addressed e-mails generated by the single destination mail generation control unit to a facsimile server as the specified server as a destination.

* * * * *